(12) United States Patent
Maesato

(10) Patent No.: US 6,874,435 B2
(45) Date of Patent: Apr. 5, 2005

(54) FURNACE FOR CARBONIZING

(76) Inventor: Toshio Maesato, 5-17, Sumiyoshi 2-chome, Okinawa-shi, Okinawa (JP)

( * ) Notice: Subject to any disclaimer, the term of this patent is extended or adjusted under 35 U.S.C. 154(b) by 0 days.

(21) Appl. No.: 10/670,287

(22) Filed: Sep. 26, 2003

(65) Prior Publication Data

US 2004/0060487 A1 Apr. 1, 2004

(30) Foreign Application Priority Data

Oct. 1, 2002 (JP) .................................. P2002-289107
Apr. 8, 2003 (JP) .................................. P2003-104450

(51) Int. Cl.[7] .............................................. F23G 5/02
(52) U.S. Cl. ...................................... 110/230; 110/246
(58) Field of Search .......................... 202/96, 133, 242, 202/245, 246, 82; 110/229, 230, 231, 246, 197, 226, 275, 276, 342, 115; 122/6.6; 432/5; 219/390

(56) References Cited

U.S. PATENT DOCUMENTS 4,361,100 A * 11/1982 Hinger ........................ 110/238
5,119,395 A * 6/1992 Hemsath et al. ............. 373/112

FOREIGN PATENT DOCUMENTS

| JP | 10-310774 | * 7/1995 | ........... C10B/53/02 |
| JP | 7-11255 | * 10/1998 | ........... C10B/53/00 |
| JP | 2001-139955 | 5/2001 | |

OTHER PUBLICATIONS

English Language Abstract of JP 2001–139955.

* cited by examiner

*Primary Examiner*—Kenneth Rinehart
(74) *Attorney, Agent, or Firm*—Greenblum & Bernstein, P.L.C.

(57) ABSTRACT

A furnace has a dual structure for carbonizing material. The furnace has a group of inner chambers and an outer chamber. Each of the inner chambers has a lid which can open and close to input the material for carbonizing. The outer chamber moves so that the group of inner chambers is housed in the outer chamber. Due to this, a combustion space is formed between the group of inner chambers and the outer chamber so as to heat each of the inner chambers to dry the material by distillation.

35 Claims, 33 Drawing Sheets

FURNACE FOR CARBONIZING

BACKGROUND OF THE INVENTION

1. Field of the Invention

The present invention relates to a furnace which has a dual structure for carbonizing trash, waste tires, waste plastics, waste vinyl, and garbage etc.

2. Description of the Related Art

Conventionally, a furnace for carbonizing has one inner chamber to which the waste is input, and an outer chamber which can move apart from the inner chambers. A combustion space is formed between the inner chamber and the outer chamber so as to heat the inner chamber.

For example, as shown in Japanese Unexamined Patent Publication (KOKAI) NO.2001-139955, the furnace for carbonizing is provided with two inner chambers and one outer chamber. In this case, the outer chamber is moved from one inner chamber to another chamber so that waste can be carbonized effectively.

However, if the waste is put in the inner chamber in large quantities, the gas which is generated from the waste etc. can not be discharged from the inner chamber efficiently, further the waste cannot be heated in the inner chamber efficiently. Therefore, the waste can not be carbonized in large quantities effectively. Namely, the amount of waste which can be put in one inner chamber is limited, hence the amount of waste per furnace is limited.

SUMMARY OF THE INVENTION

Therefore, an object of the present invention is to provide a furnace, which can carbonize waste in large quantities, heat the waste in the inner chamber efficiently, and reduce fuel expenses.

According to the present invention, there is provided a furnace for carbonizing material. The furnace comprises a group of inner chambers and an outer chamber having an opening. Each inner chamber in the group of inner chambers has a lid which can be opened and closed to input material. The outer chamber and the group of inner chambers moves relative to each other so that the group of inner chambers is housed in the outer chamber through the opening, whereby a combustion space is formed between the group of inner chambers and the outer chamber so as to heat each of the inner chambers to dry the material by distillation. Due to this, the material in the inner chamber can be heated efficiently, and the fuel expenses are reduced.

Preferably, the outer chamber moves so that the group of inner chambers is housed in the outer chamber.

Each of the inner chambers extends substantially in a horizontal direction, one end of each of the inner chambers being closed, another end of each of the inner chambers having a lid. Each lid may separate from each inner chamber. One end of the outer chamber is closed and another end of the outer chamber has the opening.

The furnace comprises a plurality groups of inner chambers. In this case, the outer chamber is movable from one of the plurality of groups of inner chambers to another of the plurality of groups of inner chambers. Due to this, the many groups of inner chambers can be heated continuously.

The furnace further comprises a holder that holds an outer cover and a group of inner chambers. The outer cover covers the opening when the group of inner chambers is housed in the outer chamber.

The furnace further comprises a carrier which moves in the inner chamber, the material being loaded into the carrier. Preferably, a plurality of the carriers are housed in each of the inner chambers, one of the plurality of carriers being disposed above another of the plurality of carriers. Due to this, the material is further carbonized efficiently.

The outer chamber moves in one of a horizontal direction and a vertical direction. An outer surface of the inner chamber may be provided with a heat receiving portion which projects outward. Due to this, the inner chamber can be further heated efficiently.

The furnace may comprise a holder which holds the group of inner chambers, and the holder moves in one of a horizontal direction and a vertical direction.

The material is carbonized whereby gas is generated from the material, and then the gas is discharged from the inner chamber. Preferably, a part of the discharged gas is sent back to each of the inner chambers.

The furnace further comprises a combustion apparatus which burns the discharged gas. The combustion apparatus has a first combustion room, a second combustion room, and a brick layer.

The discharged gases are sent to the first combustion room, and the discharged gas is burnt in the first combustion room. The discharged gas which has passed through the first combustion room is sent to the second combustion room. The discharged gas is burnt again using charcoal in the second combustion room. The brick layer is heated by the charcoal. The discharged gas which has passed through the first combustion room or the second combustion room is burnt again by the brick layer.

According to the present invention, there is provided a furnace for carbonizing material. The furnace comprises a group of inner chambers, an outer chamber having an opening, and a moving apparatus. Each inner chamber in the group of inner chambers has a lid which can be opened and closed to input the material. The moving apparatus moves the outer chamber and the group of inner chambers relative to each other so that the group of inner chambers is housed in the outer chamber through the opening to form a combustion space between the groups of inner chambers and the outer chamber for heating each of the inner chambers to dry the material by distillation.

According to the present invention, there is provided a furnace for carbonizing material. The furnace comprises an outer chamber and a group of inner chambers. Each chamber in the group of inner chambers has an inner lid which can be opened and closed to input material. The group of inner chambers is provided in the outer chamber so that a combustion space is formed between the inner chambers and the outer chamber so as to heat each of the inner chambers to dry the material by distillation. The outer chamber has a first outer lid which can be opened and closed. And the first outer lid is located over the inner lid so as to input the material to the inner chamber.

The outer chamber further has a second outer lid which can be opened and closed so as to cool the inner chamber.

According to the present invention, there is provided a furnace for carbonizing material. The furnace comprises an outer chamber and an inner chamber that is provided in the outer chamber so that a combustion space is formed between the inner chamber and the outer chamber for heating the inner chamber to dry the material by distillation. The inner chamber has a lid which can be opened and closed to input material. And the inner chamber rotates around the longitudinal axis of the inner chamber. This longitudinal axis extends substantially in a horizontal direction.

The furnace further comprises a rotating element for rotating the inner chamber. The rotating element is disposed on an end of the inner chamber. The end is located outside the outer chamber.

The inner chamber may be inserted through the outer chamber whereby the inner chamber rotatively fixes to the outer chamber.

Preferably, an inner surface of the inner chamber is provided with a blade which extends substantially in a horizontal direction so as to mix the material when the inner chamber rotates.

The furnace further comprises a holder having a plurality of hollows and a plurality of balls being rotatively fitted into the plurality of hollows. The inner chamber is rotatively held by the plurality of balls in the holder. In this case, an outer surface of the inner chamber may be provided with a plurality of groove elements which extend around the inner chamber in a rotational direction of the inner chamber. And the inner chamber rotates on the plurality of balls, which fit in the plurality of grooves. Preferably, the groove elements form guide portions which extend around the inner chamber in a rotational direction of the inner chamber. The inner chamber is rotationally guided on the guide portions.

The inner chamber extends substantially in the horizontal direction.

Preferably, the outer chamber and the inner chamber move relative to each other so that the inner chamber is housed in the outer chamber. In this case, the furnace may further comprise a plurality of the inner chambers. The outer chamber is movable from one of the plurality of inner chambers to another of the plurality of inner chambers.

Preferably, the furnace further comprises a holder that holds the inner chamber and an outer cover. The outer chamber has an opening. The outer cover covers the opening when the inner chamber is housed in the outer chamber whereby a combustion space is formed between the inner chamber and the outer chamber.

In this case, the inner chamber is arranged through the outer cover whereby the inner chamber is rotatively fixed to the cover portion.

The inner chambers may form a group of inner chambers, and the group is provided in the outer chamber. In this case, the outer chamber and the group of inner chambers can move relative to each other so that the group of inner chambers is housed in the outer chamber. Preferably, the furnace comprises a plurality of groups of inner chambers. And the outer chamber is movable from one of the plurality of groups of inner chambers to another of the plurality of groups of inner chambers.

The furnace further comprises a separation apparatus that cools gas discharged from the inner chamber so as to liquefy the discharged gas. The separation apparatus has a first separation pipe that connects with the inner chamber and a second separation pipe that connects with the first separation pipe through a joint pipe. The discharged gas passes through the second separation pipe after passing through the first separation pipe. The separation apparatus further has a cooling apparatus that cools the discharged gas in the first and second separation pipes. In this separation apparatus, a diameter of the first separation pipe is larger than a diameter of the second separation pipe.

The furnace may comprise the separation apparatus described below instead of the separation apparatus described above.

The separation apparatus has a first pipe group containing a plurality of first separation pipes and a cooling apparatus which cools the discharged gas in the first separation pipes. Each of the first separation pipes connects with the inner chamber. The discharged gas passes through the first separation pipes.

The separation apparatus further has a connection pipe which connects with the inner chamber. The plurality of first separation pipes connects with the inner chamber through the connection pipe.

Preferably, the plurality of the first separation pipes have the same length, and extend in the same direction. One end of the first separation pipes connects with the connection pipe, another end of the first separation pipes connects with a joint pipe.

Preferably, adjoining first separation pipes in the first pipe group are separated from one another.

The separation apparatus further has the joint pipe with which the plurality of first separation pipes connect, and a second pipe group of a plurality of second separation pipes. The plurality of second separation pipes connect with the joint pipe. The discharged gas passes through the second separation pipes after passing through the first separation pipes. The cooling apparatus also cools the discharged gas in the second separation pipes.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
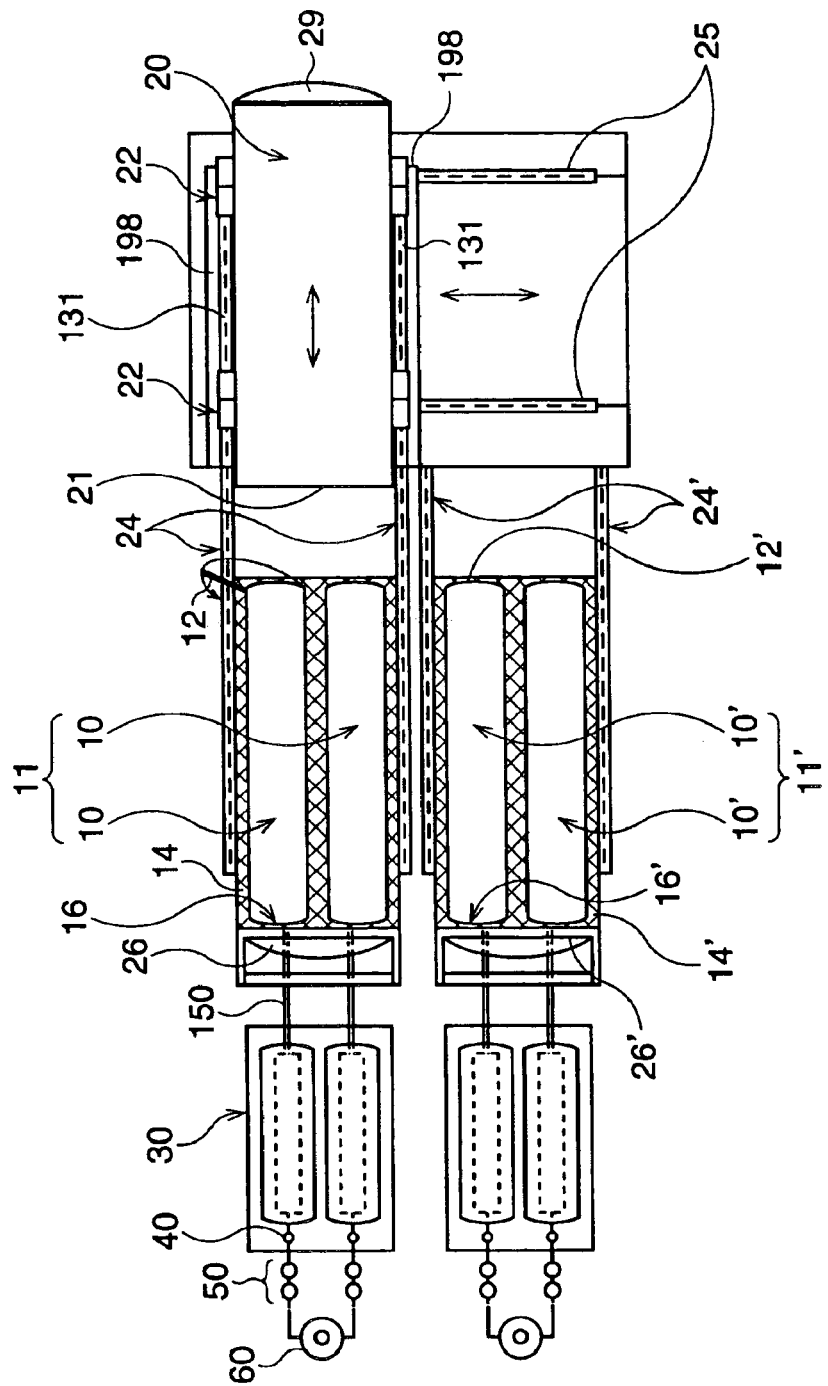
FIG. 1 is a plan view of a furnace in a first embodiment according to the present invention.

The present invention will be described below with reference to the embodiments shown in the drawings.

Figure 2:
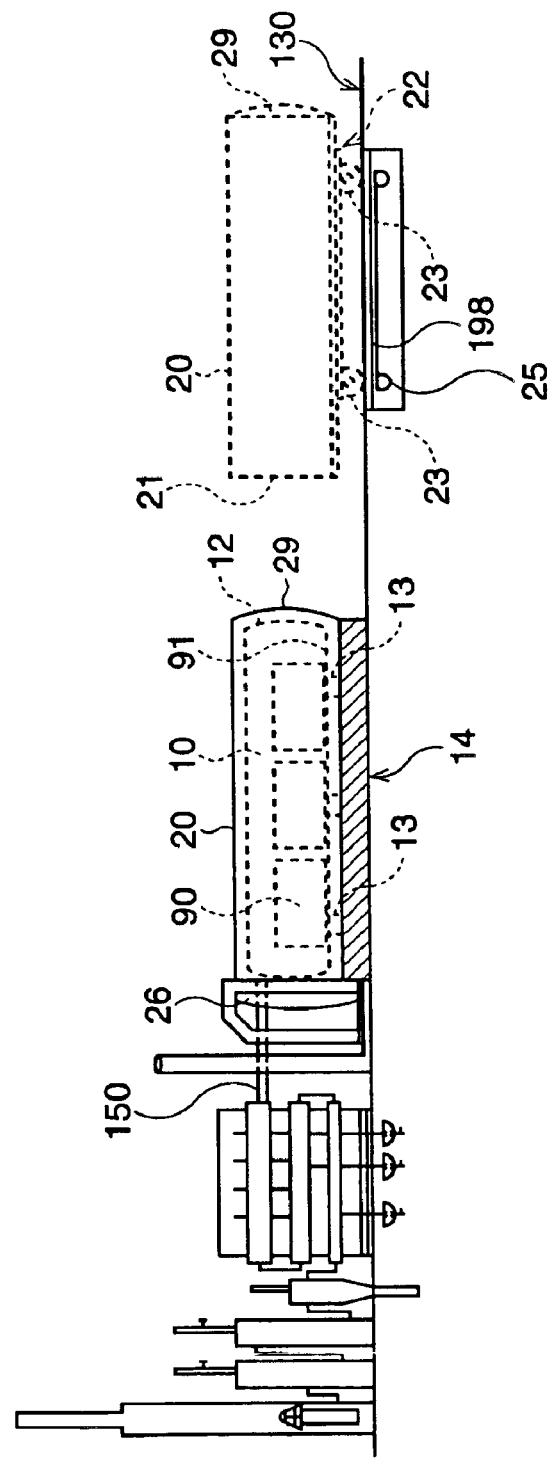
FIG. 2 is a side view of the furnace in the first embodiment.

FIG. 1 is a plan view of a furnace in a first embodiment according to the present invention. FIG. 2 is a side view of the furnace in the first embodiment The furnace for carbonizing material, is provided with first and second groups of inner chambers 11 and 11', an outer chamber 20, a separation apparatus 30, a gas separator 40, a deodorization apparatus 50, and a combustion apparatus 60.

The first group of inner chambers 11 has two inner chambers 10. The second group of inner chambers 11' also has two inner chambers 10'. The outer chamber 20 moves so that the group of inner chambers 11 or 11' is housed in the outer chamber 20 and is apart from the outer chamber 20. When the group of inner chambers 11 or 11' is housed in the outer chamber 20, a combustion space is formed between the outer surface of the inner chambers 10 or 10' and the inner surface of the outer chamber 20 so as to heat the inner chambers 10 or 10' to dry the material by distillation. The material is dried by distillation so as to be carbonized the material.

The separation apparatus 30 cools the gas discharged from the inner chambers 10 or 10' so as to liquefy the discharged gas. The deodorization apparatus 50 deodorizes the discharged gas. The combustion apparatus 60 burns the discharged gas that is not collected in the separation apparatus 30 etc.

The inner chambers 10 and 10' extend substantially in a horizontal direction. Namely, a diameter of the inner chambers 10 and 10' is shorter than a length of the inner chambers 10 and 10' in substantially in a horizontal direction. Four inner chambers 10 or 10' are arranged in same line in width direction of the inner chambers 10 and 10'. Namely, the first and second groups of inner chambers 11 and 11' are arranged in the same line.

One end of each of the inner chambers 10 and 10' is a closed end 16, and 16'. Another end of each of the inner chambers 10 and 10' has the inner lid 12 and 12'. The inner lids 12 and 12' are attached to the inner chambers 10 and 10' by hinge joints etc. The inner lids 12 and 12' can be opened and closed to input the material.

Each closed end 16, and 16' is provided with connection pipes 150. The discharged gas which is generated in the inner chambers 10 and 10', is discharged to the separation apparatus 30 through the connection pipes 150.

Three carbon carriers 90, into which the material is loaded, are housed on the bottoms 91 of the inner chambers 10 and 10'. Three carbon carriers 90 are arranged in one line in the longitudinal direction of the inner chambers 10 or 10'.

The outer chamber 20 extends substantially in a horizontal direction. One of the group of inner chambers 11 or 11' can be housed in the outer chamber 20. One end of the outer chamber 20 is a closed end 29. Another end of the outer chamber 20 is an end opening 21. The end opening 21 is covered by an outer cover 26 or 26' when the group of inner chambers 11 (or 11') is housed in the outer chamber 20. The inner chambers 10 (or 10') and the outer cover 26 (or 26') are held by a chamber holder 14 (or 14'). A bottom of an outer cover 26 (or 26') is held by an end of the chamber holder 14 (or 14').

On a ground 130, first and second rails 24, 24' are constructed. The first and second rails 24, 24' extend in the longitudinal direction of inner chambers 10 and 10' and the outer chamber 20. The outer chamber 20 moves on the rails 24 (or 24'). Due to this, the group of inner chambers 11 (or 11') can be housed in the outer chamber 20 and can be apart from the outer chamber 20.

Third rails 25, which cross at right angles to the first and second rails 24 and 24', are constructed under the ground 130. A movable holder 198, is provided on the third rails 25. An upper surface of the movable holder 198 is flush with an upper surface of the ground 130. The outer chamber 20 is mounted on the movable holder 198 through a chamber moving apparatus 22. Short rails 131 are constructed on the movable holder 198 so that the outer chamber 20 can move from the movable holder 198 to the rails 24 or 24'. A distance between rails 131 is the same as a distance between rails 24 or rails 24'. Due to this, the outer chamber 20 is movable back and forth from the group of inner chambers 11 or (11') to the group of inner chambers 11' or (11), so that the group of inner chambers 11 or 11' can be housed in the outer chamber 20, and so that the group of inner chamber 11 or 11' can be apart from the outer chamber 20.

Figure 3:
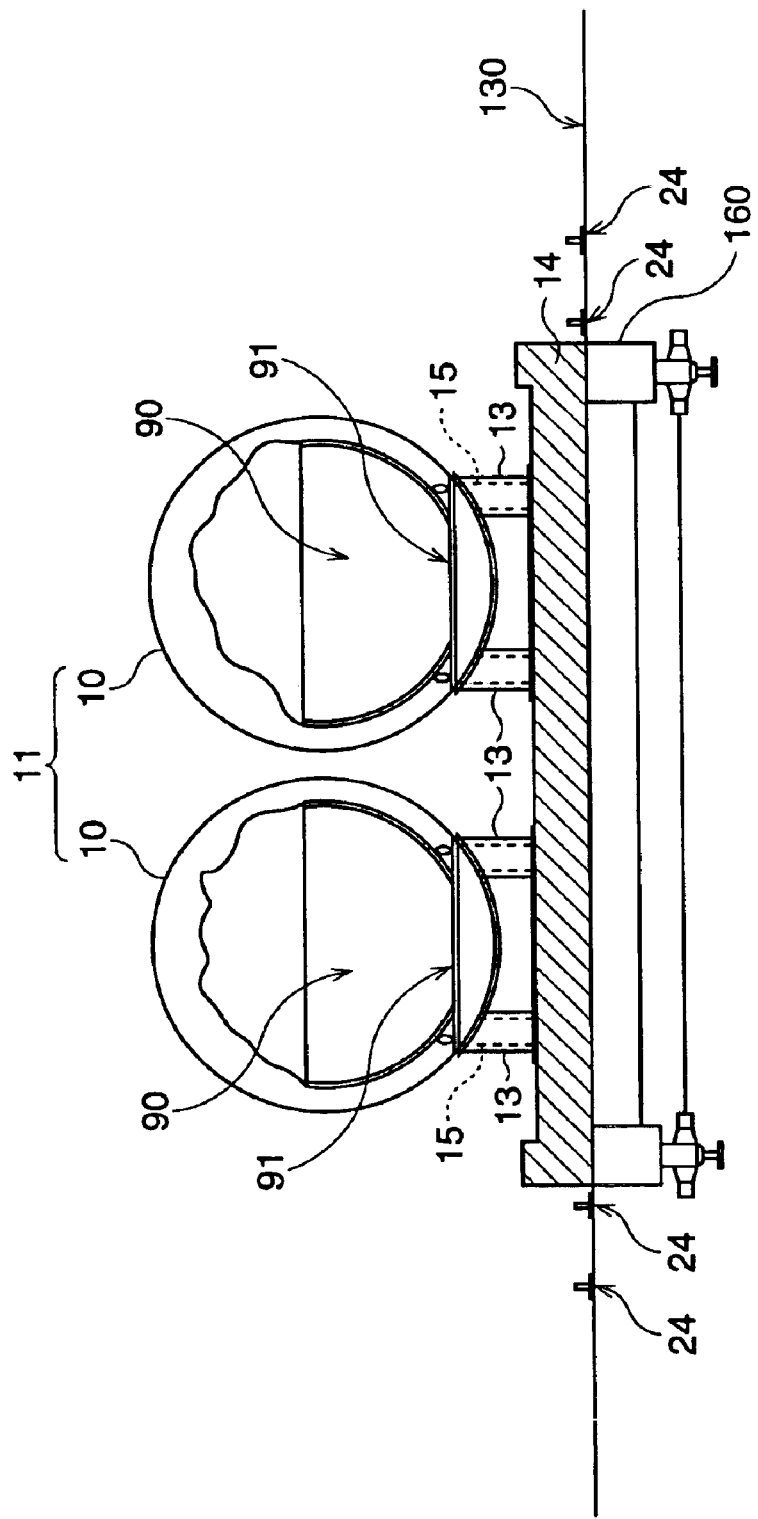
FIG. 3 is a cross-sectional view of the inner chambers in the first embodiment.

FIG. 3 is a cross-sectional view of the group of inner chambers 11. The inner chamber 10 has a plurality of legs 15. The chamber holder 14, which is provided on the ground 130, has a plurality of leg receivers 13. The leg receivers 13 are located at the positions which correspond to the legs 15. The legs 15 are inserted into the leg receivers 13 so that the inner chamber 10 is held by the chamber holder 14.

A holder moving apparatus 160 is provided under the ground 130 and below the chamber holder 14. The holder moving apparatus 160 moves the chamber holder 14 up and down. The holder moving apparatus 160 is hydraulically operated for example. In the leg 15, a thermometer and a manometer are inserted. Ends of the thermometer and the manometer are disposed in the inner chamber 10. Temperatures and pressures in the inner chambers 10 and 10' are measured by the thermometers and the manometers. In the leg 15, a gas tube (not shown in the Figures) is also inserted. The gas tube is connected to an inside of the inner chamber 10.

Oxygen is deficient and the temperature is high in the inner chamber 10 or 10' after carbonizing material. Therefore, inert gas or water flows into the inner chamber through the gas tube after the carbonizing finishes in order to prevent the material from igniting.

Further, the gas is sent back to the inner chamber 10 from the gas separator 40 while the material is carbonized as described below in order to maintain good circulation of the gas in the inner chamber 10, and to prevent pressure in the inner chamber 10 from becoming too high in a local zone.

Furthermore, a check valve is provided at a connecter between the inner chamber 10 or 10' and the gas tube so as to prevent the gas from flowing backward.

Further, the inner chamber 10 or 10' is connected with a vacuum pump through a joint pipe. The vacuum pump inhales the gas in the inner chamber 10 so as to decrease the pressure in the inner chamber 10 when the pressure rises.

Figure 4:
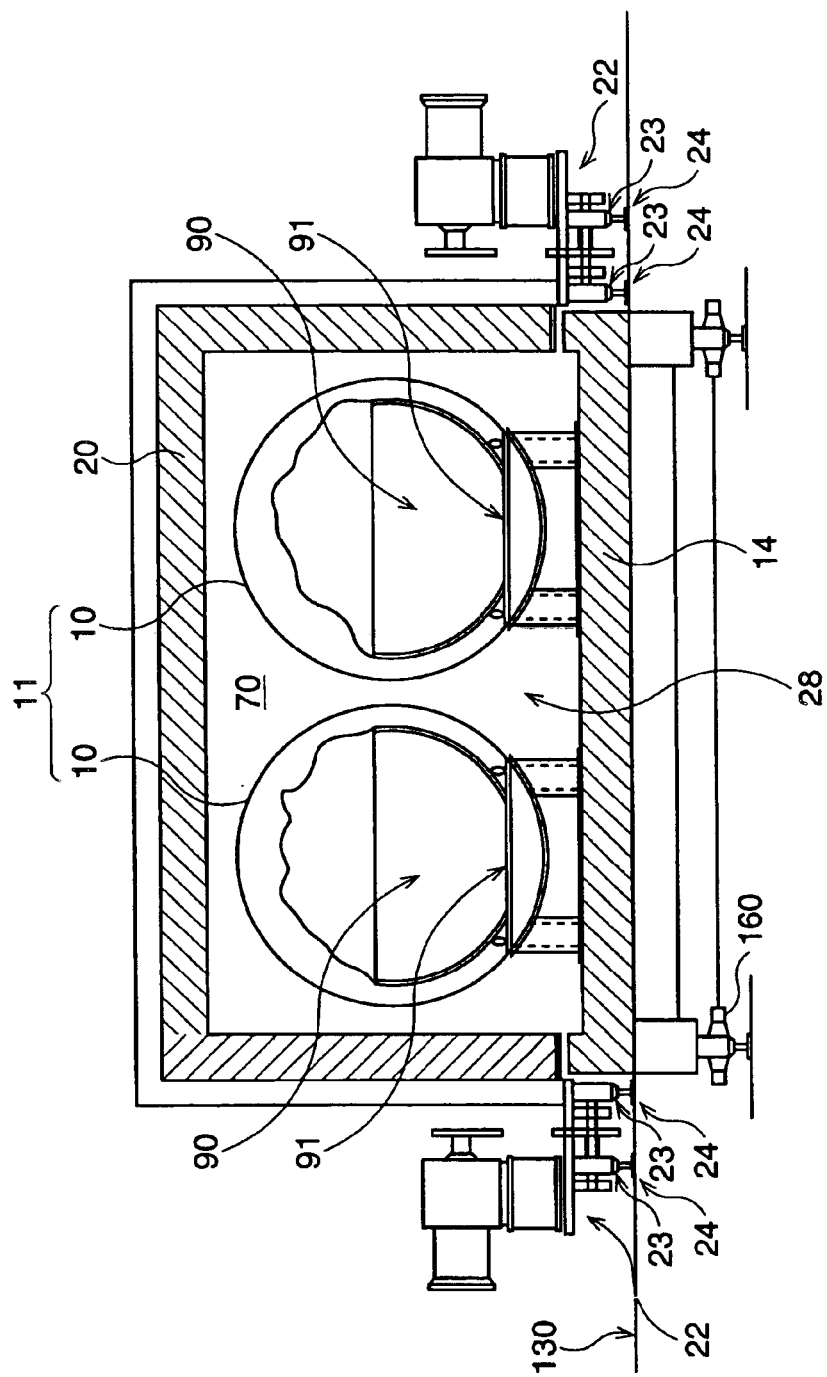
FIG. 4 is a cross-sectional view of the furnace when the inner chambers are housed in an outer chamber in the first embodiment.

FIG. 4 is a cross-sectional view of the furnace when the inner chambers 10 are housed in the outer chamber 20. The outer chamber 20 is carried on the chamber moving apparatus 22. The chamber moving apparatus 22 has wheels 23. The wheels 23 move on rails 24, 24', or 131 so that the outer chamber 20 is moved.

Figure 5:
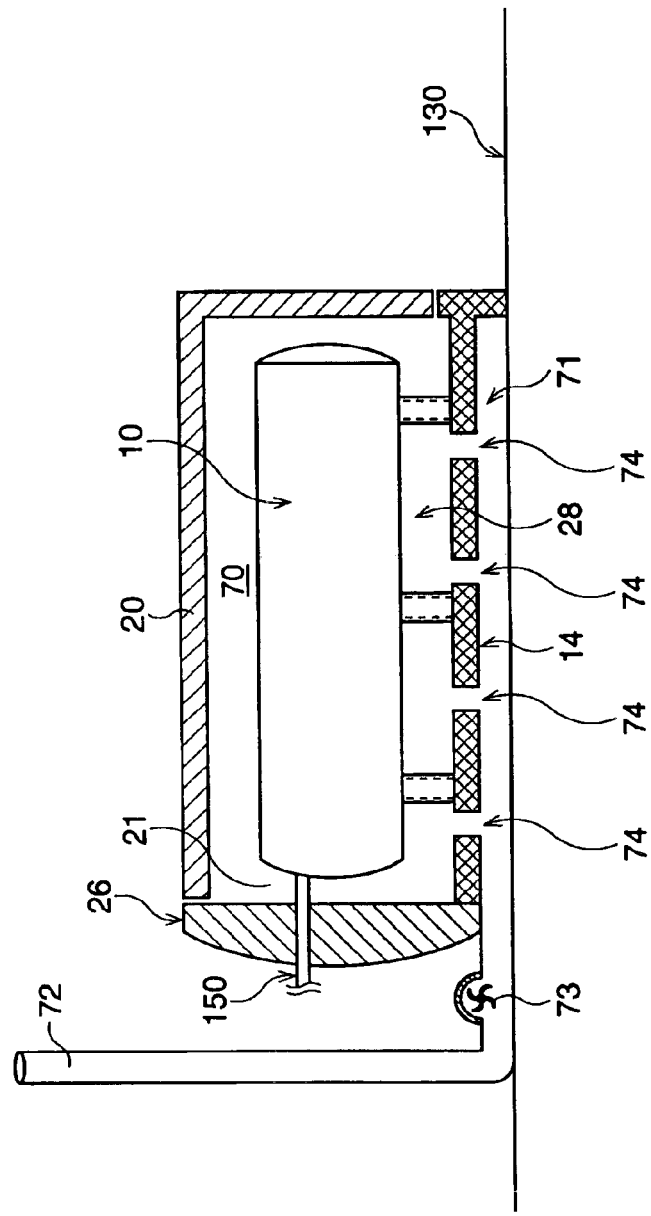
FIG. 5 is a vertically sectional view of the furnace when the inner chambers are housed in the outer chamber in the first embodiment.

FIG. 5 is a vertical sectional view of the furnace when the group of inner chambers 11 is housed in the outer chamber 20. The outer chamber 20 is a rectangular-box shaped having a longitudinal direction in the horizontal direction. At the bottom of the rectangular parallelepiped-box is a bottom opening 28 and at the end of the rectangular-box is an end opening 21.

The chamber holder 14 is a flat board whose width and length are substantially the same as the width and length of the bottom opening 28. The height and width of the outer cover 26 are substantially the same as the height and width of the outer chamber 20.

Namely, the group of inner chambers 11 is wholly housed in the outer chamber 20 through the end opening 21 and the bottom opening 28, when the outer chamber 20 moves to the group of inner chambers 11. And then, the end opening 21 is covered over with the outer cover 26 and the bottom opening 28 is covered over with the upper surface of the chamber holder 14. Due to this, the outer chamber 20 is sealed and a combustion space 70 is formed between the outer surfaces of the inner chambers 10 and the outer chamber 20.

Further, a gap is generated between the chamber holder 14 and the outer chamber 20 when the inner chamber 10 is housed in the outer chamber 20. However, the chamber holder 14 moves upward using the holder moving apparatus 160 so that this gap is lost. The outer cover 26 is provided with a hole through which the connection pipe 150 is passed. Further, the outer cover 26 is provided with an observation hatch for observing the combustion space 70.

In the combustion space 70, fuel burns using a gas burner etc. in order to heat the inner chamber 10. The chamber holder 14 is provided with heating mouths 74 at even intervals to each other. Fire made by the burner, burns from the heating mouths 74 into the combustion space 70. The combustion space 70 is connected with an air vent 71 through the heating mouths 74. The air vent 71 passes under the outer cover 26 and is then connected with a chimney 72 standing upright. Therefore, exhaust gas from the combustion space 70 is excreted from the chimney 72 through the air vent 71. A vacuum fan 73 is provided inside the air vent 71 and rotates in order to excrete the exhaust gas easily.

The vacuum fan projects into a part of the route of the air vent 71. Therefore, the vacuum fan 73 will not obstruct the excretion of the exhaust gas if the vacuum fan 73 stops rotating. Further, if the tar of the gas adheres to the vacuum fan 73, the vacuum fan 73 stops to rotate. However, the vacuum fan 73 can be detached and be washed in order to remove the tar for example.

While the inner chambers 10 is heated, the material which is input to the inner chamber 10 is carbonized, and then a liquid is generated from the material. The material is waste tires, waste plastics, trash, waste vinyl, or garbage for example. The generated liquid is further heated to change it to gas. The gas is discharged from the inner chamber 10 to the separation apparatus 30 through the connection pipe 150.

Figure 6:
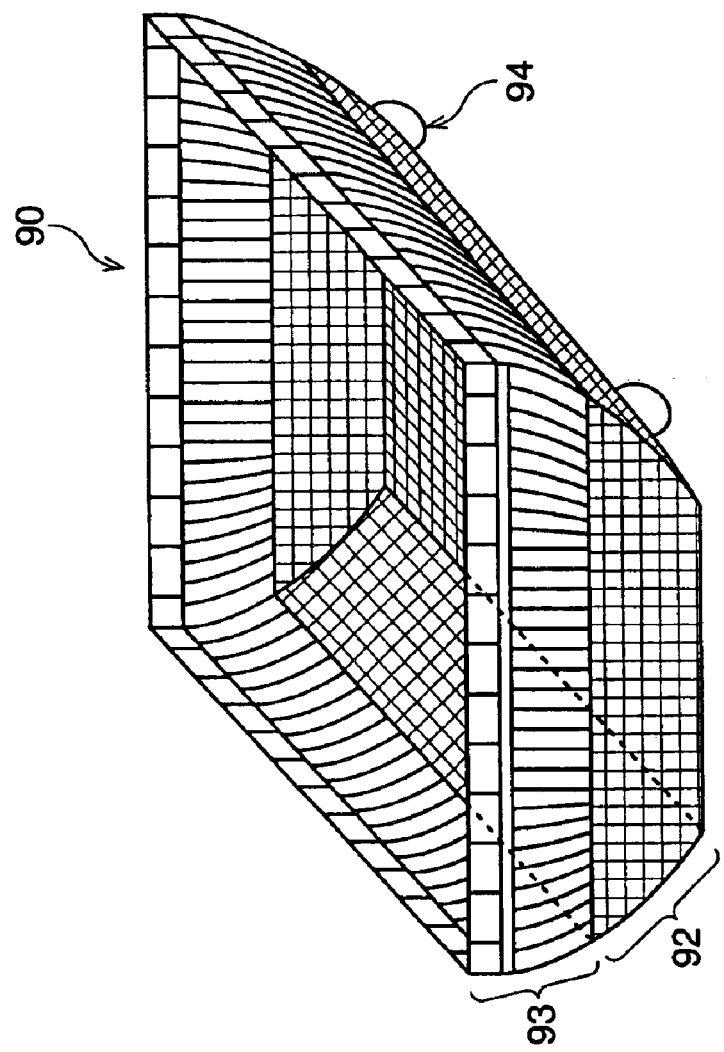
FIG. 6 is a perspective view of a carbon carrier in the first embodiment.

FIG. 6 is a perspective view of the carbon carrier 90. The carbon carrier 90 comprises a basket portion 92, a frame portion 93, and wheels 94. The basket portion 92, into which the material is loaded, is reticular. The basket portion 92 has a bottom and sides. The frame portion 93 is provided on the side rim of the basket portion 92 in order to prevent the basket portion 92 from deforming.

The carbon carrier 90 conducts the heat of the inner chamber 10 to the material loaded on the carbon carrier 90 quickly because the basket portion 92 is reticular. Further, the mesh of the basket portion 92 is so fine that the material and the carbonized material on the carbon carrier 90 can not drop from between mesh. The bottom of the basket portion 92 is flat so as to contact with the inner surface of the bottom 91 of the inner chamber 10.

The wheels 94 are disposed under the bottom of the basket portion 92. Due to this, the carbon carrier 90 can be pushed and rolled to move in the inner chamber 10 as the user likes.

Figure 7:
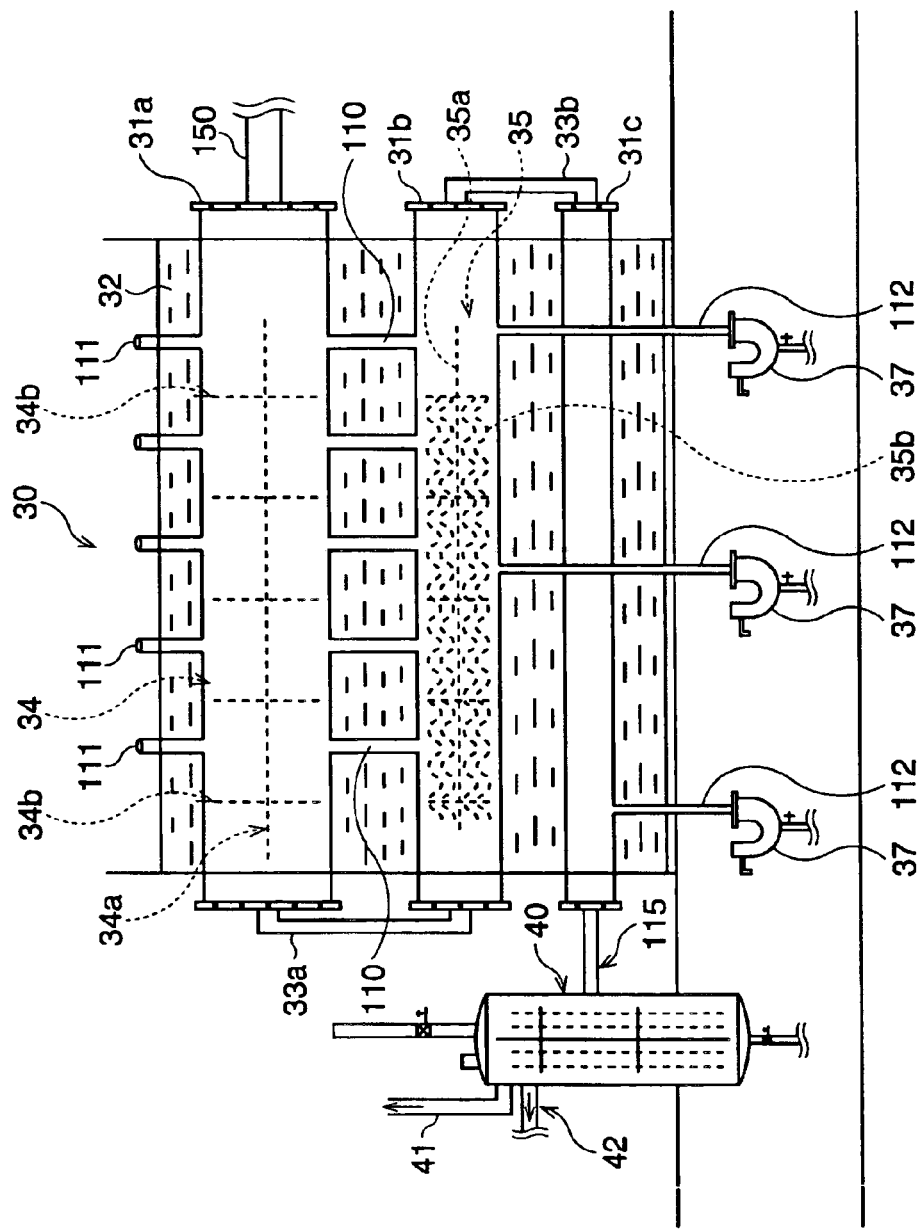
FIG. 7 is a side view of a separation apparatus in the first embodiment.

FIG. 7 is a cross-sectional view of the separation apparatus 30. The separation apparatus 30 cools gas discharged from the inner chamber 10 so as to liquefy the discharged gas. The separation apparatus 30 has a cooling apparatus 32. The cooling apparatus 32 is filled with cooling liquid. The separation apparatus 30 further has a first separation pipe 31a, a second separation pipe 31b, and a third separation pipe 31c in the cooling apparatus 32. The second separation pipe 31b is arranged below the first separation pipe 31a. The third separation pipe 31c is arranged below the second separation pipe 31b. The separation pipes 31a, 31b, and 31c extend in a direction which is substantially horizontal. The diameter of the first separation pipe 31a is the largest of the diameters of the three pipes, and the diameter of the third separation pipe 31c is the smallest of the diameters of the three pipes.

Figure 8:
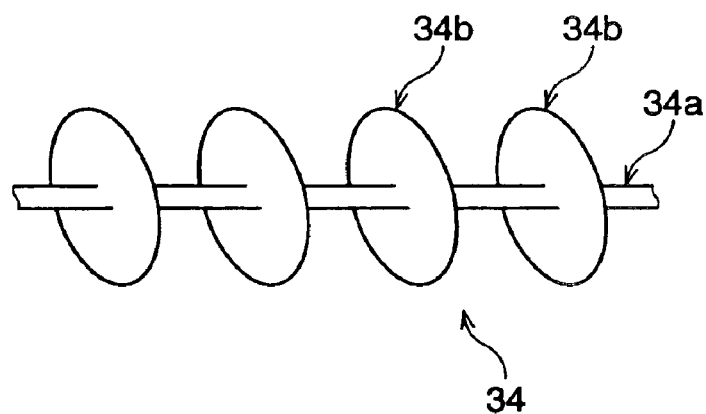
FIG. 8 is a schematic view of a first liquefaction apparatus in the first embodiment.
Figure 9:
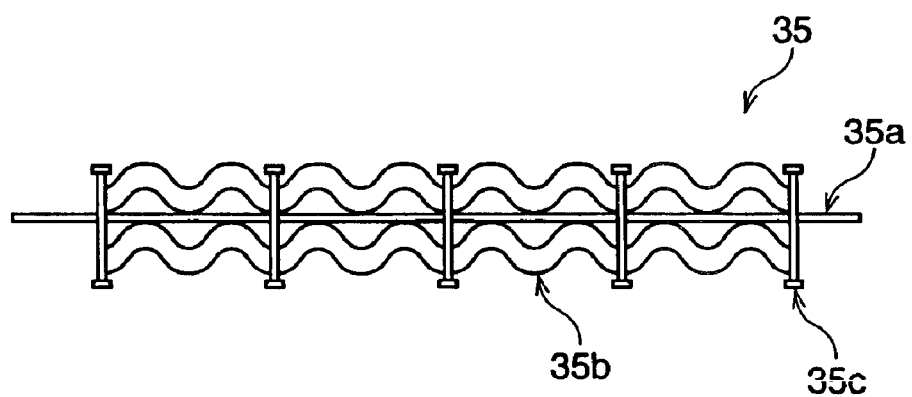
FIG. 9 is a schematic view of a second liquefaction apparatus in the first embodiment.

The inside of the first separation pipe 31a is provided with a first liquefaction apparatus 34 as shown in FIG. 8. The inside of the second separation pipe 31b is provided with a second liquefaction apparatus 35 as shown in FIG. 9. The liquefaction apparatus 34 and 35 is detachable and washable.

As shown in FIG. 8, the first liquefaction apparatus 34 has a shaft 34a. The shaft 34a is provided with a plurality of obstruction boards 34b at even intervals. The plurality of obstruction boards 34b extend in perpendicular planes to the shaft 34a.

As shown in FIG. 9, the second liquefaction apparatus 35 has a shaft 35a, four wavy obstruction boards 35b, and board fittings 35c. The obstruction boards 35b are parallel with the shaft 35a. Board fittings 35c, which extend in a direction perpendicular to the shaft 35a, are provided on a shaft 35a at equal distances to each other. The obstruction boards 35b are attached to the shaft 35a with board fittings 35c.

As shown in FIG. 7, the connection pipe 150, which is connected with the inner chamber 10, is connected with a center of one end of the first separation pipe 31a. A center of another end of the first separation pipe 31a is connected with a center of one end of the second separation pipe 31b through a first joint pipe 33a. A center of another end of the second separation pipe 31b is connected with a center of one end of the third separation pipe 31c through the second joint pipe 33b. The first and second joint pipes 33a and 33b are located outside of the cooling apparatus 32. A center of another end of the third separation pipe 31c is connected with the gas separator 40 through the connection pipe 115.

A bottom of the first separation pipe 31a is provided with a plurality of small pipes 110 that extend in a vertical direction. The small pipes 110 are connected with the top of the second separation pipe 31b Extension pipes 111 extend upward from the top of the first separation pipe 31a. The exchanged gas in the first separation pipe 31a can be observed to check the gas color etc through the extension pipes 111. The small pipes 110 etc. can be washed by using water etc. poured from the extension pipes 111. The tops of the extension pipes 111 are provided with lids (not shown in the Figures). The lids open up when the pressure of the inner chamber 10 rises, namely the lids perform as a safety valve.

The bottom of the second separation pipe 31b is connected with two drain pipes 112 and the bottom of the third separation pipe 31c is connected with one drain pipe 112. The drain pipes are connected with drain tanks 37.

The discharged gas, which is sent from the inner chamber 10, bumps into the obstruction boards 34b and is cooled by the cooling apparatus 32 to be liquefied, while the discharged gas passes through the first separation pipe 31a. The discharged gas, which is not liquefied in the first separation pipe 31a, is sent to the second separation pipe 31b through the first joint pipe 33a. This discharged gas bumps into the obstruction boards 35b and is cooled by the cooling apparatus 32 to become liquefied, while the discharged gas passes through the second separation pipe 31b.

The liquid, which is generated in the first separation pipe 31a, is sent to the second separation pipe 31b through the small pipes 110. The liquid which is sent to the second separation pipe 31b and which is generated in the second separation pipe 31b is sent to the drain tank apparatuses 37 through the drain pipes 112.

The discharged gas, which is not liquefied in the second separation pipe 31b, is sent to the third separation pipe 31c through the joint pipe 33b. This sent gas is liquefied in the third separation pipe 31c. The liquid, which is generated in the third separation pipe 31c, is sent to the drain tanks 37. The discharged gas, which is not liquefied in the third separation pipe 31c, is sent to the gas separator 40. This sent gas is liquefied in the gas separator 40, and the gas not liquefied in the gas separator 40 is sent to the deodorization apparatus 50 through the gas pipe 42.

Further, the gas separator 40 is provided with a circulation pipe 41 which is connected with the inner chamber 10 through the gas tube described above. The gas in the gas separator 40 is sent back to the inner chamber 10 through the circulation pipe 41.

Furthermore, the inner chambers 10 can be connected with the separation apparatuses 30 as shown in FIG. 1. However, more than one of the inner chambers 10 may be connected with the same separation apparatus 30. Further, each the separation apparatus 30 has its own cooling apparatus 32. However, more than one of the separation apparatuses 30 may be provided with one shared cooling apparatus 32.

Figure 10:
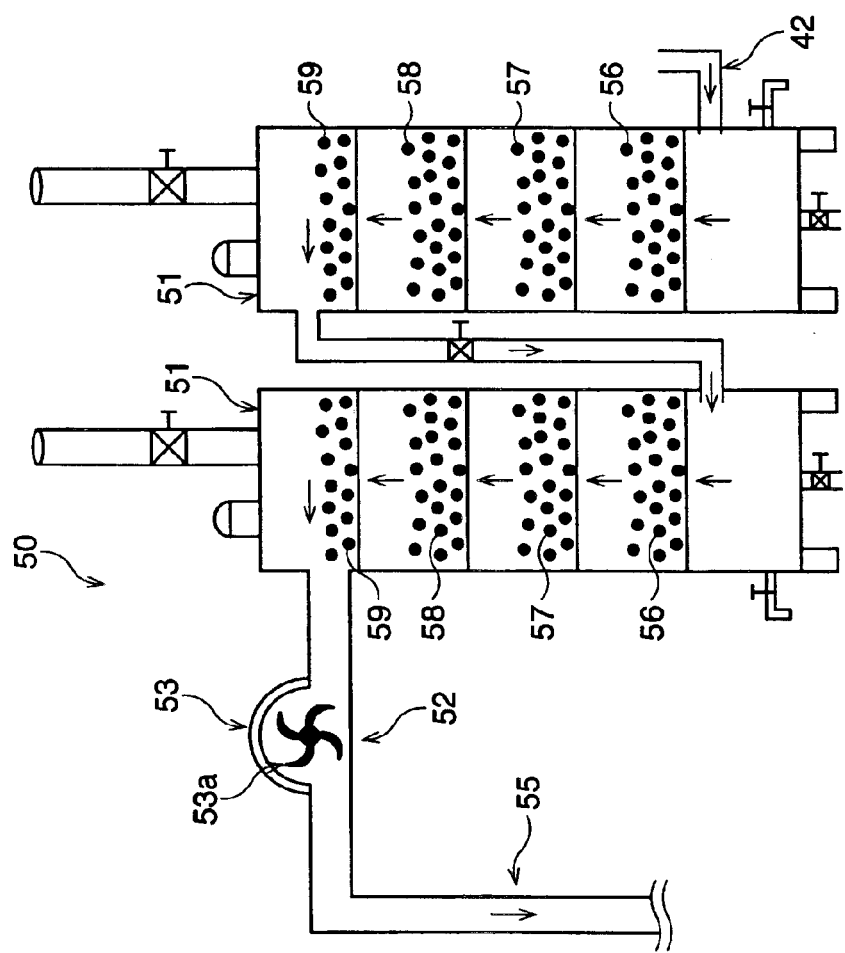
FIG. 10 is a cross-sectional view of a deodorization apparatus in the first embodiment.

The deodorization apparatus 50 is shown in FIG. 10. The deodorization apparatus 50 is connected with the gas separator 40 thorough a gas pipe 42. The deodorization apparatus 50 is provided with two deodorization devices 51. Four plates are arranged in vertical direction in the deodorization device 51. A charcoal layer 56 made from tires is provided on the lowest plate, an activated carbon charcoal layer 57 is provided on the second lowest plate, a charcoal layer 58 made from wood is provided on the second highest plate, and a activated carbon charcoal layer 59 is provided on the highest plate. The gas, which is sent from the gas separator, is passed through these four layers from the lowest plate to the highest plate to be deodorized. The gas is sent to a discharged pipe 52 after passing two deodorization devices 50.

The deodorization apparatus 50 is provided with a vacuum apparatus 53. The vacuum apparatus 53 is provided on discharge pipe 52. The vacuum apparatus 53 has a vacuum fan 53a, which projects into the discharge pipe 52. The vacuum fan 53a rotates to vacuum the air in order to pass the gas from the layer 56 to the layer 59. The gas vacuumed by the vacuum apparatus 53 is sent to a passing pipe 55.

Figure 11:
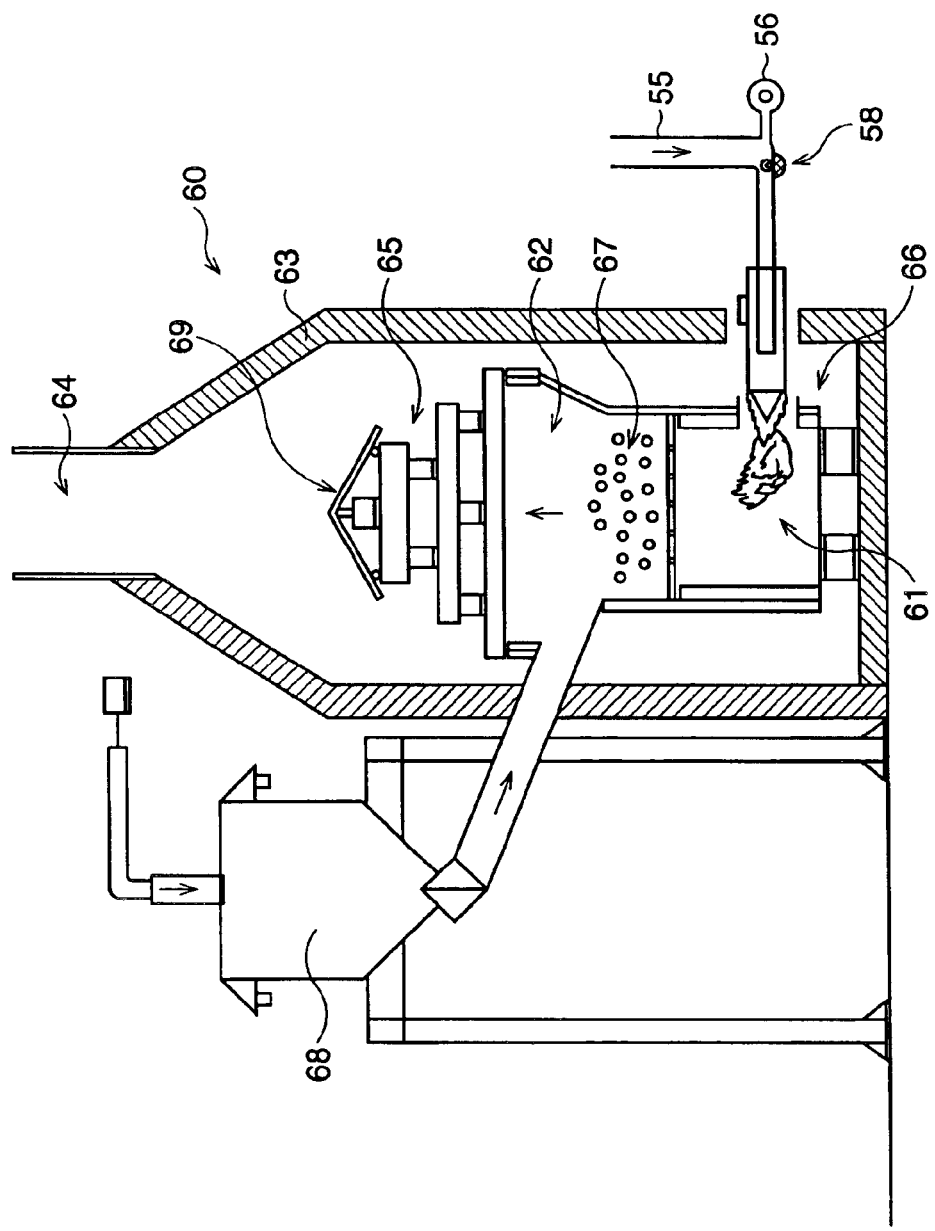
FIG. 11 is a cross-sectional view of a combustion apparatus in the first embodiment.

FIG. 11 shows a combustion apparatus 60. The combustion apparatus 60 comprises a combustion portion 66 and a combustion frame 63. The combustion frame 63 surrounds the combustion portion 66 at a predetermined distance.

The combustion portion 66 is provided with a first combustion room 61, a second combustion room 62 which is arranged above the combustion room 61, and a brick layer 65 which is arranged above second combustion room 62.

The passing pipe 55, which connected the combustion apparatus 60 with the deodorization apparatus 50, is provided with a blower 56. The gas is sent to the first combustion room 61 by the blower 56, and is ignited by an ignition device 58 which is provided on the passing pipe 55. Due to this, this gas is burnt in the first combustion room 61.

A charcoal 67 is laid in the second combustion room 62. The charcoal 67 is thrown down from a hopper 68 automatically.

The brick layers 65 are formed to be pilled up with several layers of heat-resistant bricks. Each of the bricks forming one layer, extend to cross at right angles to each the bricks forming the next layer each other. Stainless steel boards 69 are laid on the highest brick layer.

The charcoal 67 is heated and then burnt so as to heat the brick layers 65 and the stainless steel boards 69 at more than 1,300° C. If the brick layer 65 and the stainless steel boards 69 are at more than 1,300° C., the discharged gas is burnt by the brick layer 65 and the stainless steel boards 69. Thereafter, the charcoal 67 ceases to be thrown from a hopper 68 because there is much charcoal in the second combustion room 62 enough to burn the discharged gas.

The discharged gas, which has passed through the first combustion room 61, is sent to the second combustion room 62, and then the discharged gas is burnt again using hot charcoal 67, in the second combustion room 62.

The discharged gas, which has passed through the second combustion room 62, is burnt by the hot brick layers 65 and the hot stainless steel boards 69. The discharged gas, which is burnt in the combustion portion 66, is excreted from a chimney 64. The excreted gas contains very little dioxin because the discharged gas is heated at high temperatures by the charcoal 67, the brick layers 65, and the steel boards 69.

Figure 12:
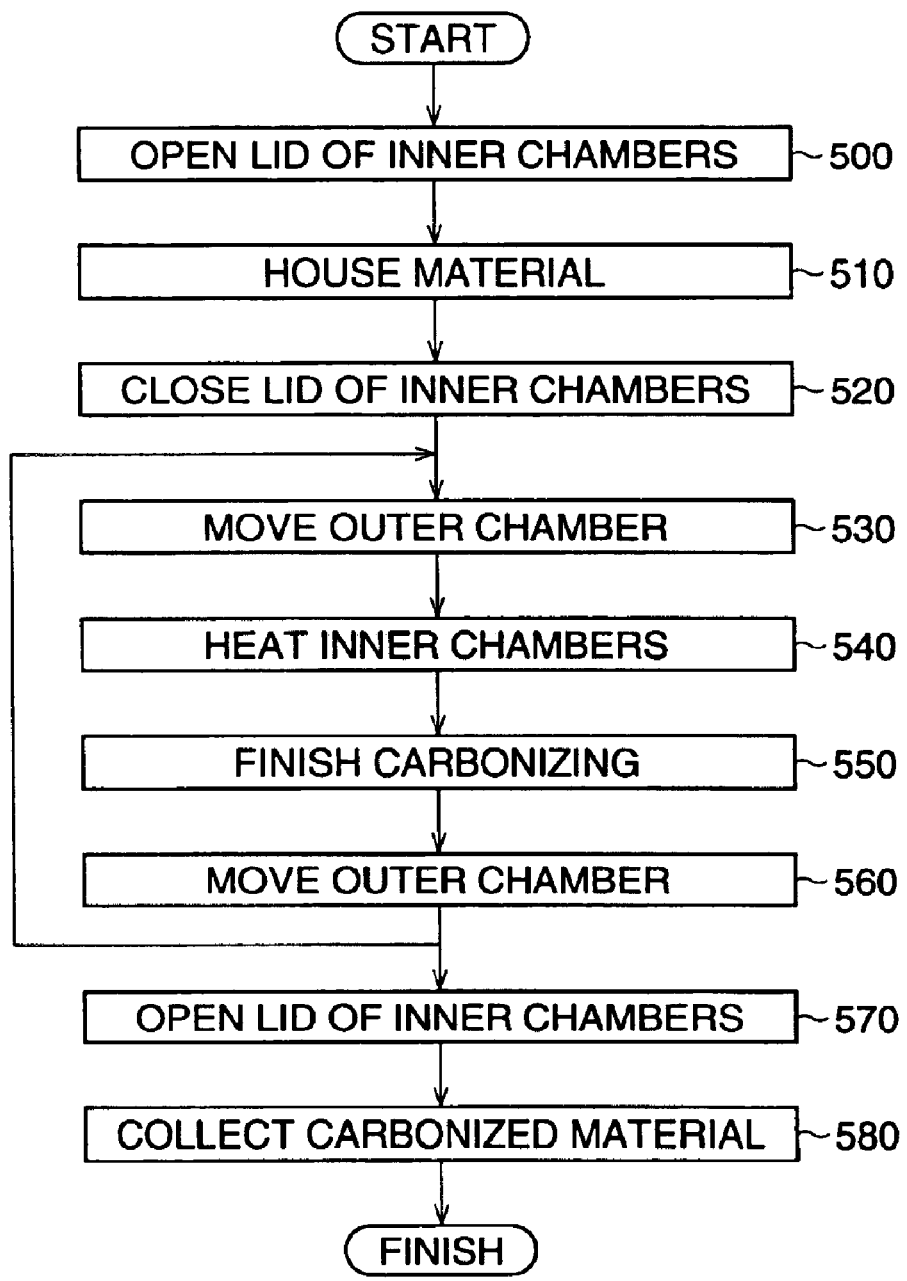
FIG. 12 is a flowchart of a carbonizing processing in the first embodiment.

FIG. 12 shows a flowchart of the carbonizing process in the first embodiment. The furnace of the first embodiment is controlled according to a program which has been written in a control device (for example a computer).

At step 500, when the outer chamber 20 is apart from the group of inner chambers 11 and 11' (as shown in FIG. 1), the inner lids 12 and 12' of the inner chambers 10 and 10' are opened. At step 510, the material is housed in the inner chambers 10 and 10'. Namely, at step 510, the carriers 90, into which the material has been loaded, are moved in the inner chambers 10 and 10'. In this case, the material is thrown from a hopper (not shown in the Figures) into the carriers, and then the carriers 90 move in the inner chamber 10 and 10' using a moving apparatus (not shown in the Figures). At step 520, the inner lids 12 and 12' are closed so that the inner chamber 10 and 10' are sealed.

At step 530, the outer chamber 20 is moved, and then the group of inner chambers 11 is housed in the outer chamber 20. At step 540, the inner chambers 10 are heated using a gas burner etc. in order to carbonize the material. In this case, the heating temperature and heating time is adjusted manually or automatically according to the kinds of material and the amount of the material.

The inner chambers 10 stop being heated at step 550, and then the outer chamber 20 moves apart from the group of inner chambers 11 at step 560. If other groups of inner chambers 11' need to be heated, the outer chamber 20 moves to the group of inner chambers 11' at step 530. In this case, the inner chamber 10' is heated in a similar way to the inner chamber 10 from step 540 to step 560.

On the other hand, at step 570, the group 11, which has finished being heated, is cooled. At the cooling, the cold water is sent to the inner chambers 10 through the gas tube described above so as to cool the inner chamber quickly. If the temperature in the inner chamber 10 is lower than a predetermined temperature, inert gas is sent to the inner chambers 10 through the gas tube. And then, the lids 12 are opened automatically, and the carbon carriers 90 are pulled out the inner chambers 10 by the moving apparatus. At step 580, the carbonized material is collected and then the carbonizing process finishes.

As described above, in this embodiment the group of inner chambers 11 or 11' is located inside the outer chamber 20, therefore, the material can be carbonized by the furnace in large quantities, in a short time. For example, if the material to be carbonized consists of different types of material, each of the different types of the material can be carbonized in each of the different inner chambers. Due to this, the different types of material can be carbonized effectively. The inner chambers are heated effectively, therefore, fuel expenses for the furnace are reduced.

Further, in this embodiment, when the group of inner chambers 11 is housed in the outer chamber 20, the chamber holder 14 can move up and down so as to get rid of the gap between the chamber holder 14 and outer chamber 20. However, the chamber holder 14 may move more up and down so that the bottoms 91 of the inside of the inner chambers 10 are flush with the ground 130. Due to this, the carbon carriers 90 move in and out the inner chambers 10 easily.

Further, when the group of inner chambers 11 is housed in the outer chamber 20, the outer chamber 20 may move down so as to get rid of the gap between the chamber holder 14 and the outer chamber 20.

Further, the inner chambers 10 and 10' are heated by the gas burner. But, the inner chambers 10 and 10' may be heated by using an oil burner or electric heating.

Further, the chamber holder 14 may be provided with wheels, therefore the inner chamber 10 can move in the longitudinal direction of the inner chamber 10 (not shown in the Figures). In this case, the holder moving apparatus 160 can be repaired and can be checked easily.

Furthermore, the outer chamber 20 is moved in order to move the outer chamber 20 and the group of inner chambers relative to each other. However, the group of inner chambers 11 and 11' may be moved independently so as to move the outer chamber 20 and the group of inner chambers relative to each other. In this case, the chamber holder 14 can move with the group of the inner chambers 11 or 11'.

Figure 13:
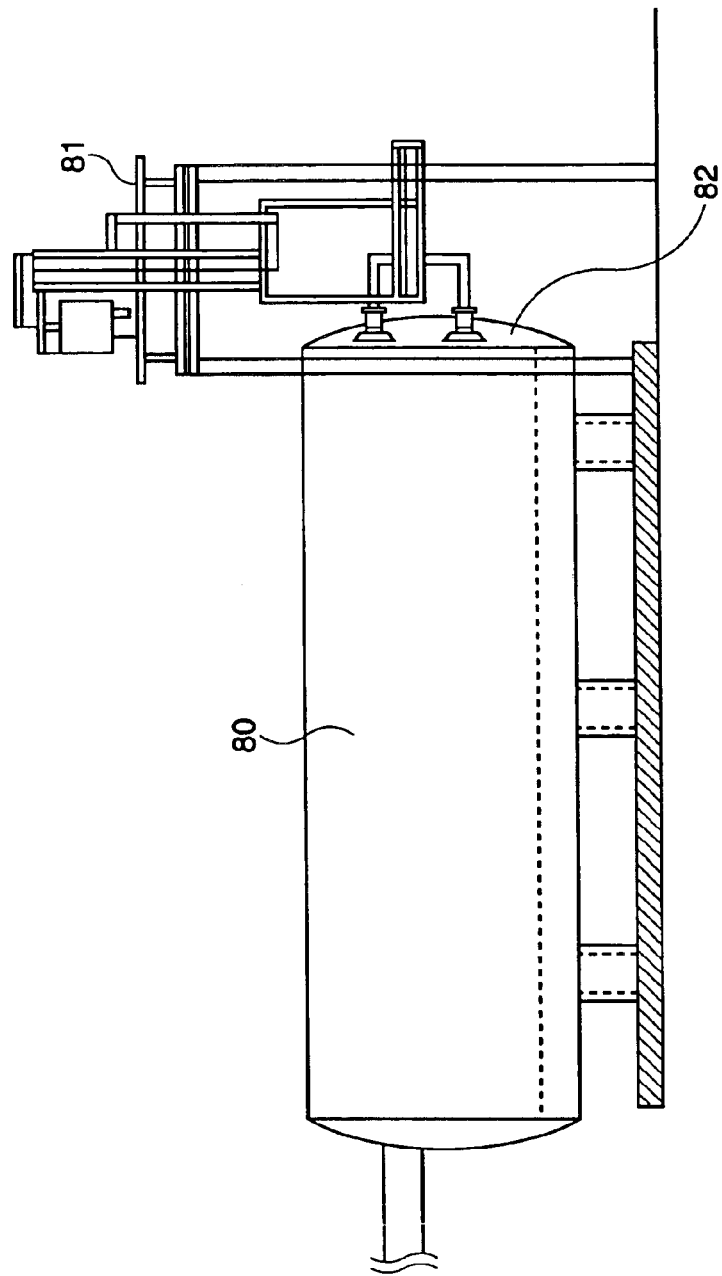
FIG. 13 is a side view of an other example of a lid of the inner chamber in the first embodiment.

FIG. 13 shows a lid of the inner chamber of the other example in the first embodiment. In this example, an inner lid 82 can be separated from an inner chamber 80. Namely, the inner lid 82 is attached to the inner chamber 80 with a plurality of stoppers which can be separated from the inner lid 82 or the inner chamber 80. The inner lid 82 is pushed by a running oil cylinder 81 and is fastened by the stoppers at several points. In this case, the inner lid 82 is fastened more tightly by the stoppers than by the hinge joint in the first embodiment because the inner lid 82 is attached at several points. Due to this, if the inner lid 82 is heavy, the inner lid 82 does not slide from the inner chamber 80.

Further, the inner surface of the inner lids 12 and 12' can be provided with a plurality of pots. In this case, the liquefied gas in the inner chamber 10 is collected in the pots in order to prevent the liquefied gas from spilling between the inner chamber 10 (or 10') and the inner lid 12 (or 12'). The liquefied gas in the pots is heated and is evaporated again, and is then discharged out of the inner chamber 10. Further, asbestos which have heat-resisting properties and water absorption properties, can be put in the pots.

Figure 14:
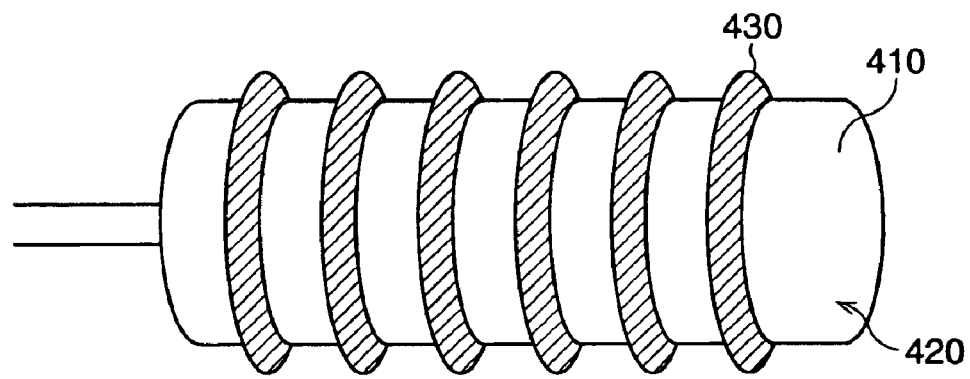
FIG. 14 is a schematic view of an other example of an inner chamber in the first embodiment.

FIG. 14 shows an example of an inner chamber in the first embodiment. In this example, an outer surface 420 of the inner chamber 410 is provided with a plurality of heat receiving portions 430 which are a plurality of sharp collars. Namely, the heat receiving portion 430 projects outward in the vertical direction of the outer surface 420 from around the inner chamber 410.

Figure 15:
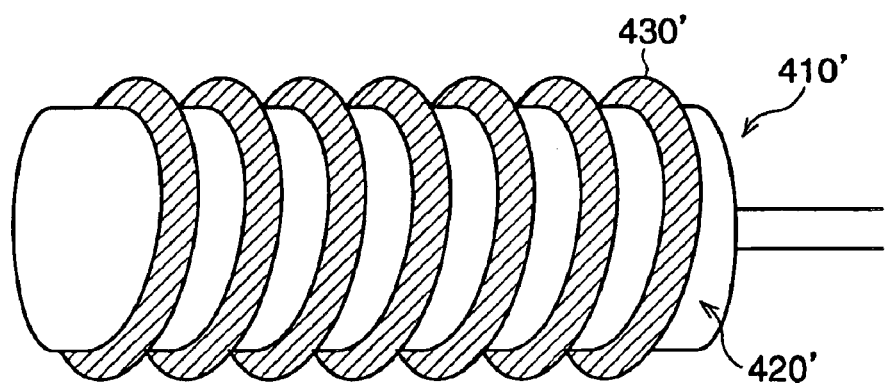
FIG. 15 is a schematic view of an other example of an inner chamber in the first embodiment.

FIG. 15 shows an other example of an inner chamber in the first embodiment. In this example, an outer surface 420' of the inner chamber 410' is provided with a heat receiving portion 430' which is wound spirally and which projects outward.

Figure 16:
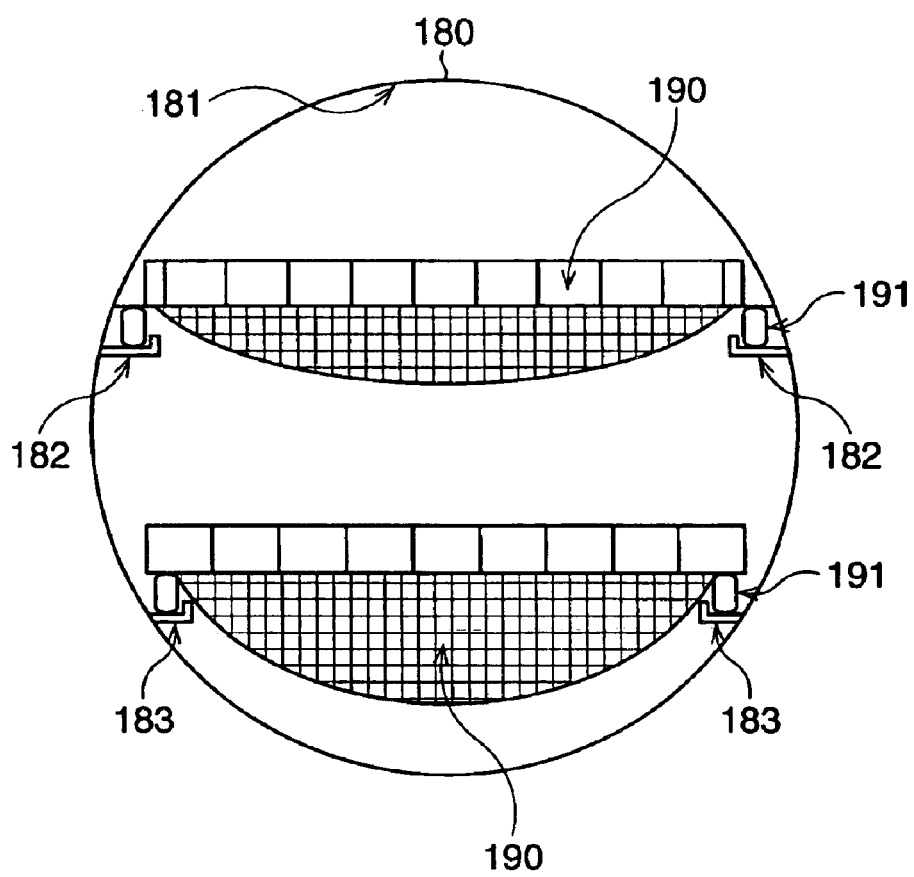
FIG. 16 is a cross-sectional view of an other example of an inner chamber in the first embodiment.

FIG. 16 shows an example of the carbon carriers in the first embodiment. In this example, a plurality of carbon carriers 190 are housed in the inner chamber 180, and one of the plurality of carbon carriers 190 is disposed above another of the plurality of carbon carriers 190. In this case, an inner surface 181 of the inner chamber 180 is provided with two pairs of the carrier rails 182 and 183. One pair of the carrier rails 182 is disposed above another pair of the carrier rails 183. The carbon carriers 190 have wheels. The wheels 190 move on carrier rails 182 and 183 so that the carbon carriers 190 are housed in the inner chamber 180. Due to this, in this example, the amount of material loaded on each carbon carrier can be decreased, therefore, the material can be heated more effectively.

Figure 17:
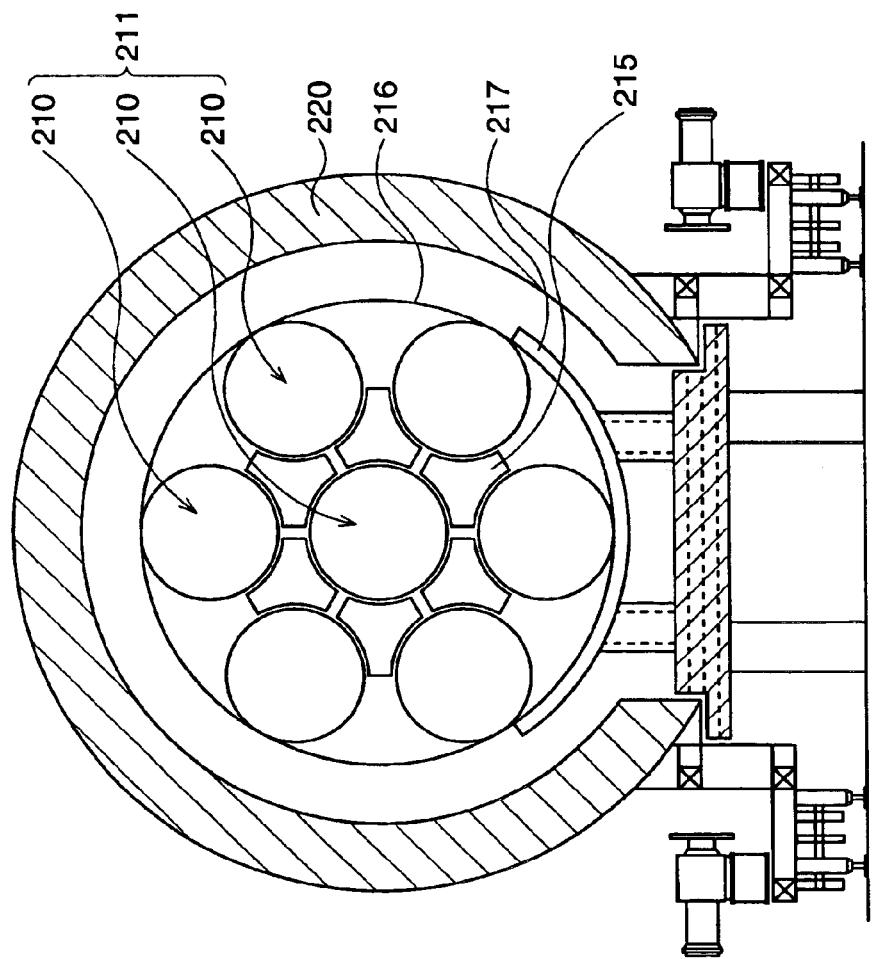
FIG. 17 is a cross-sectional view of a furnace in the second embodiment according to the present invention, when the inner chambers are housed in the outer chamber.
Figure 18:
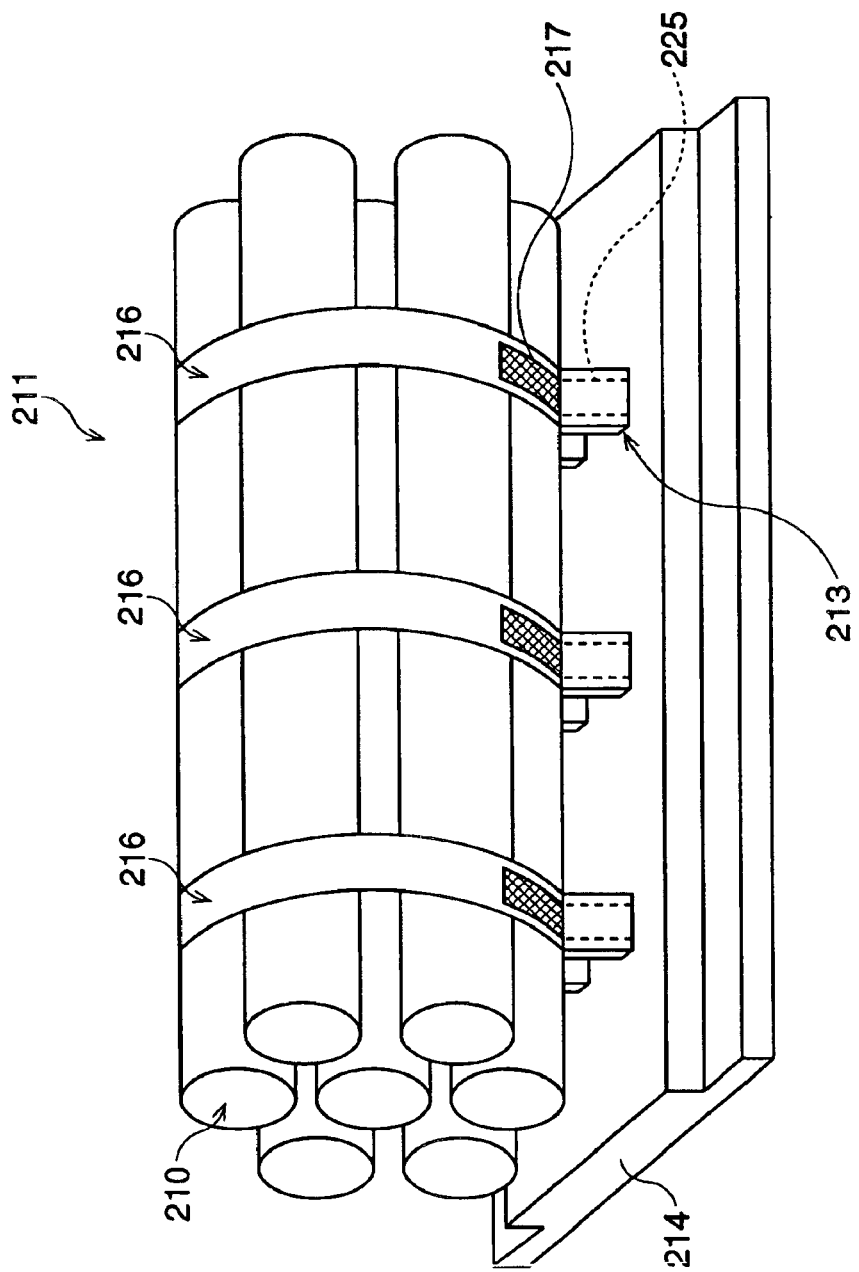
FIG. 18 is perspective view of the inner chambers in the second embodiment.

FIGS. 17 and 18 show a furnace in the second embodiment. The differences from the first embodiment will be described next. In this embodiment, a group of inner chambers 211 is formed, having seven inner chambers 210 which are parallel to one another. FIG. 17 is a cross-sectional view of the furnace when the group of inner chambers 211 is housed in the outer chamber 220. One inner chamber 210 is disposed the center of the group of inner chambers 211, and six inner chambers 210 are disposed around the center chamber 210. The distance between the center chamber 210 and each of the other chambers 210 is the same. The distance between the adjoining surrounding chambers 210 is the same. In the space between three adjoining chambers 210, a holder portion 215 which is Y-shaped, is arranged. In this embodiment, the outer chamber 220 is cylindrical.

FIG. 18 is a perspective view of the group of inner chambers 211. The group of inner chambers 211 is tied by three bundle portions 216 which are arranged at even intervals in the longitudinal direction of the group of inner chambers 211. The bottom of the bundle portions 216 is provided with a holder board 217. The bottom of the holder board 217 is provided with two legs 225. The legs 225 are inserted into leg receivers 213 so that the inner chamber 210 is held by the chamber holder 214 in similar to that in the first embodiment.

In the second embodiment, the number of inner chambers 210 forming the group of inner chambers 211 is increased, therefore, the inner chambers 210 can be heated effectively hence the fuel expenses of the furnace are further reduced.

Figure 19:
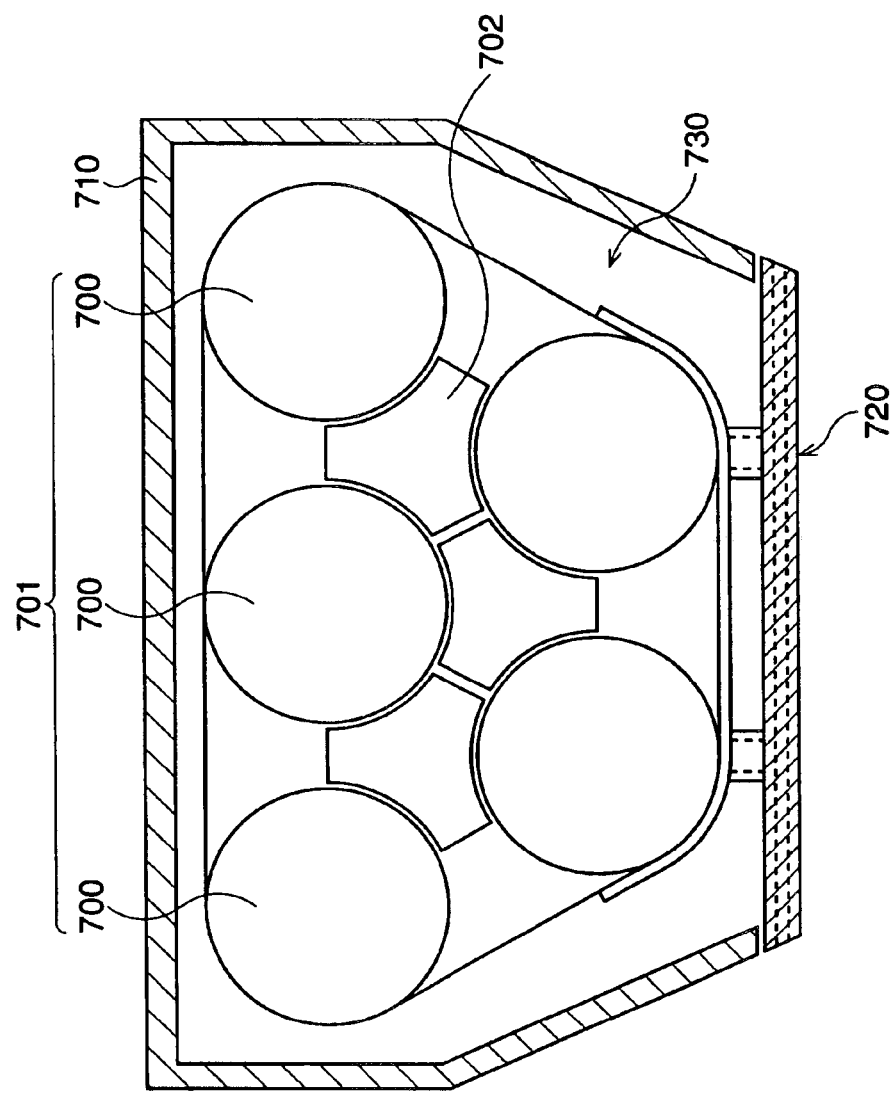
FIG. 19 is a cross-sectional view of a furnace in the other example of the second embodiment when inner chambers are housed in a outer chamber.

FIG. 19 shows an other example of the second embodiment. The furnace of this example has the same structure as that of the second embodiment except for the number of inner chambers forming the group of inner chambers. The differences from the second embodiment will be described next. The group of inner chambers 701 has five inner chambers 700 which are parallel to one another. The group of inner chambers 701 is formed of an upper layer which consists of three inner chambers 700 and a bottom layer which consists of two inner chambers 700. The center chamber 700 in the upper layer is located above the center of the bottom layer. In the space between any three adjoining chambers 700, a holder portion 702 is arranged. The cross-section of the outer chamber 710 is hexagonal.

Figure 20:
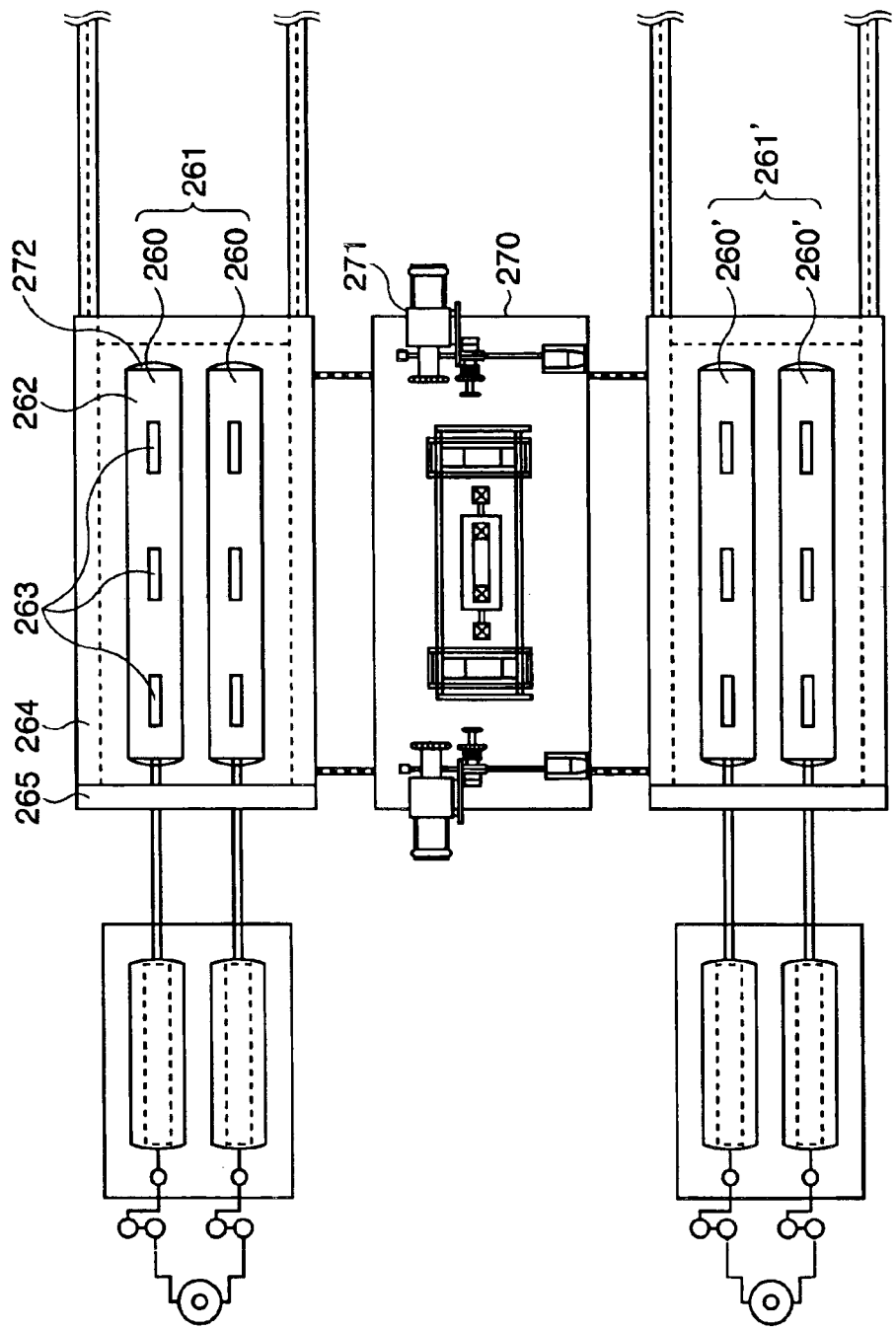
FIG. 20 is a plane view of a furnace in the third embodiment, when inner chambers are housed in an outer chamber.
Figure 21:
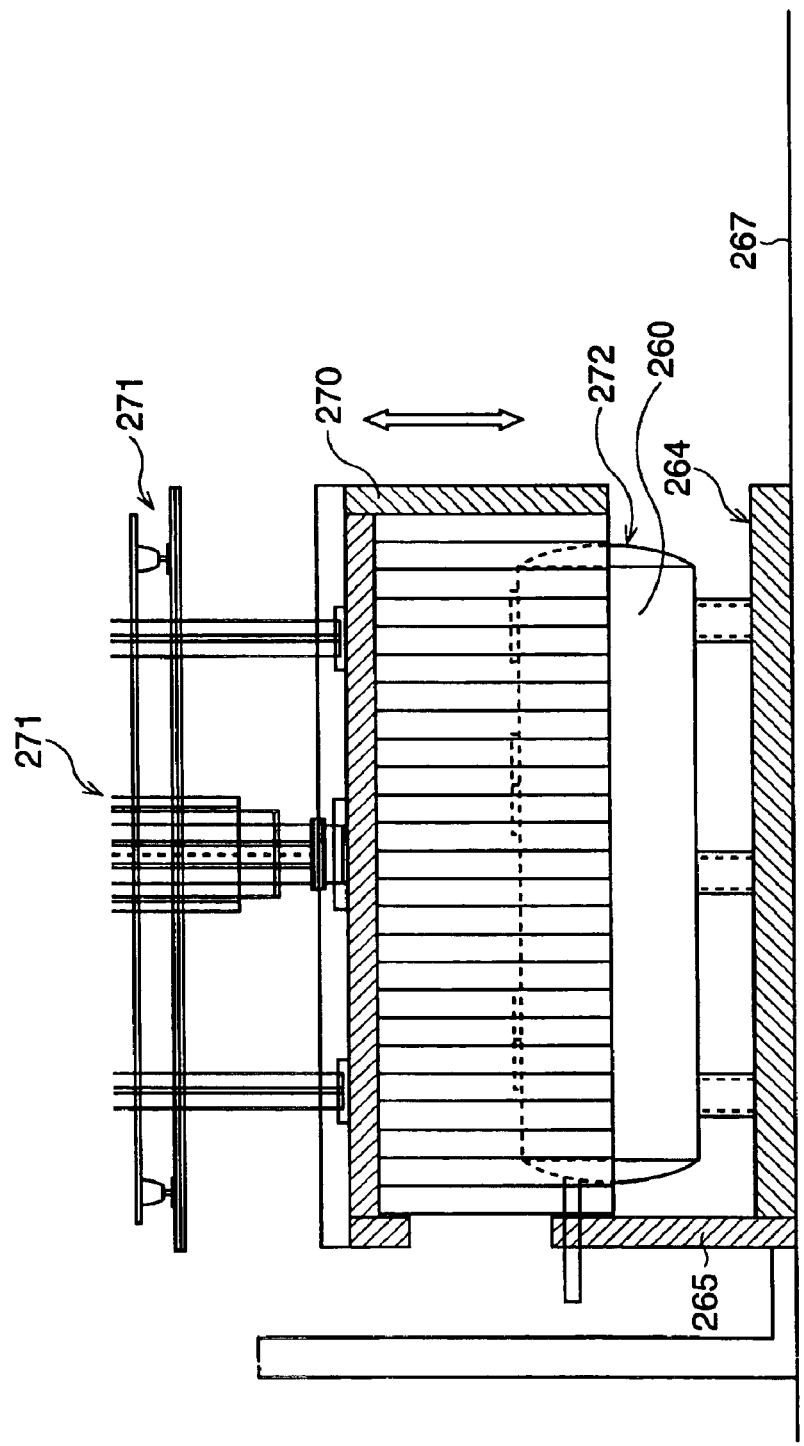
FIG. 21 is a side view of the furnace in the third embodiment according to the present invention, when the outer chamber moves.

FIGS. 20 and 21 show a furnace in the third embodiment. The differences from the first embodiment will be described next. The furnace in this embodiment is provided with a first group of inner chambers 261 which has two inner chambers 260, and a second group of inner chambers 261' which has two inner chambers 260'. The group of inner chambers 261 is held by a chamber holder 264 which is provided on the ground 267. The end of the holder 264 holds an outer cover 265. One end of the inner chamber 260 is a closed end and another end of the inner chamber 260 has an inner lid 272. The top of the inner chambers 260 has several upper lids 263. Further, carbon carriers, which are housed in the inner chamber 260, can not move (not shown in the Figs.).

An outer chamber 270 can be moved up and down, and in the width direction of the inner chambers 260 and 260' by the moving apparatus 271. Due to this, the outer chamber can move between the groups of inner chambers 261 and 261'. The group of inner chambers 261 or 261' is housed in the outer chamber 270 so that a combustion space is formed between the inner chambers 260 or 260' and the outer chamber 270 so as to heat the inner chambers 960 or 260'.

Further, the material is carried into the inner chambers 260 or 260' from the upper lids 263 using hoppers etc. And the carbonized material is carried out from the inner lid 272.

As described above, in this embodiment, the outer chamber and carbon carriers do not move in the longitudinal direction of the inner chambers. Therefore, even if the length of the inner chamber is long, the furnace can be established in a small space.

Figure 22:
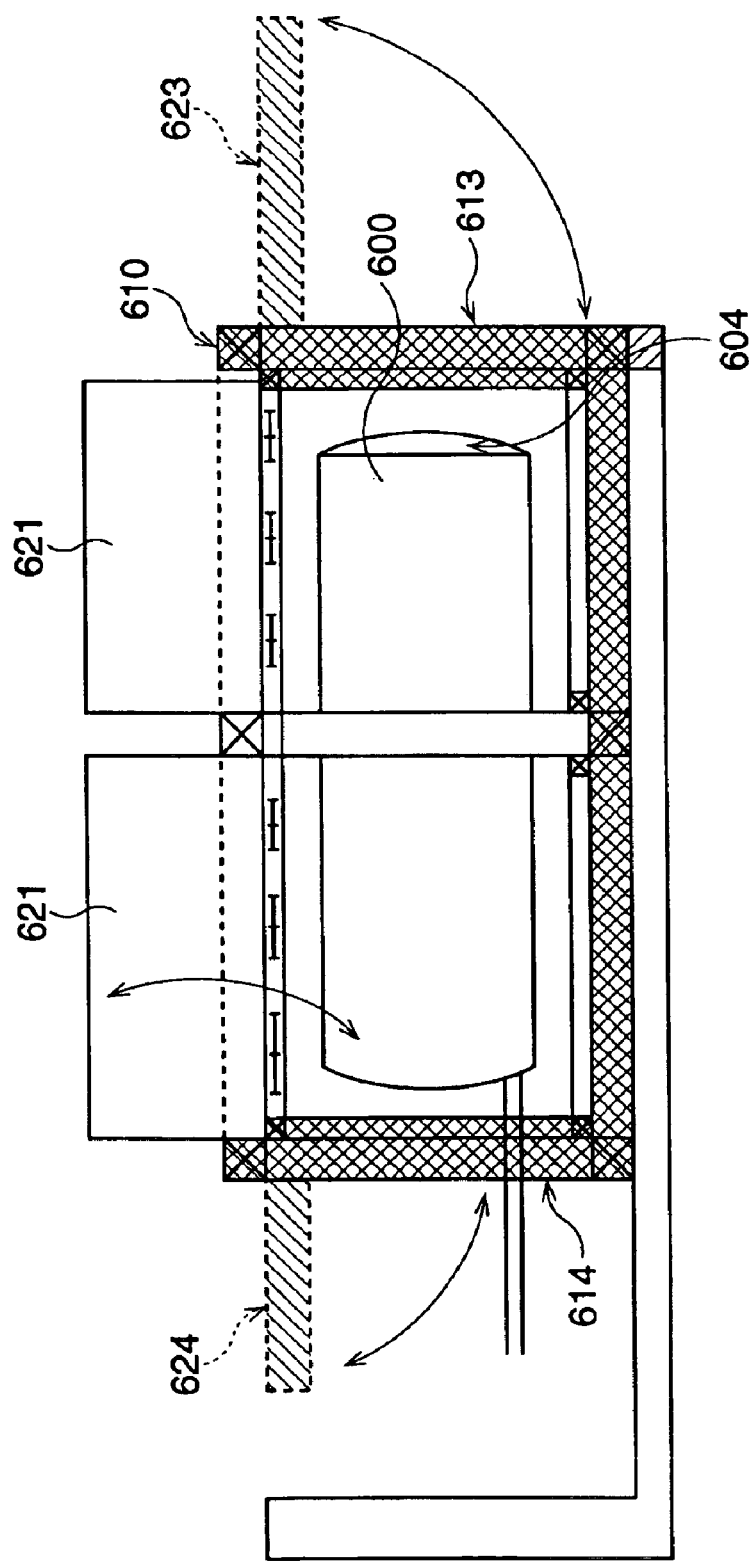
FIG. 22 is a side view of a furnace in the forth embodiment according to the present invention.
Figure 23:
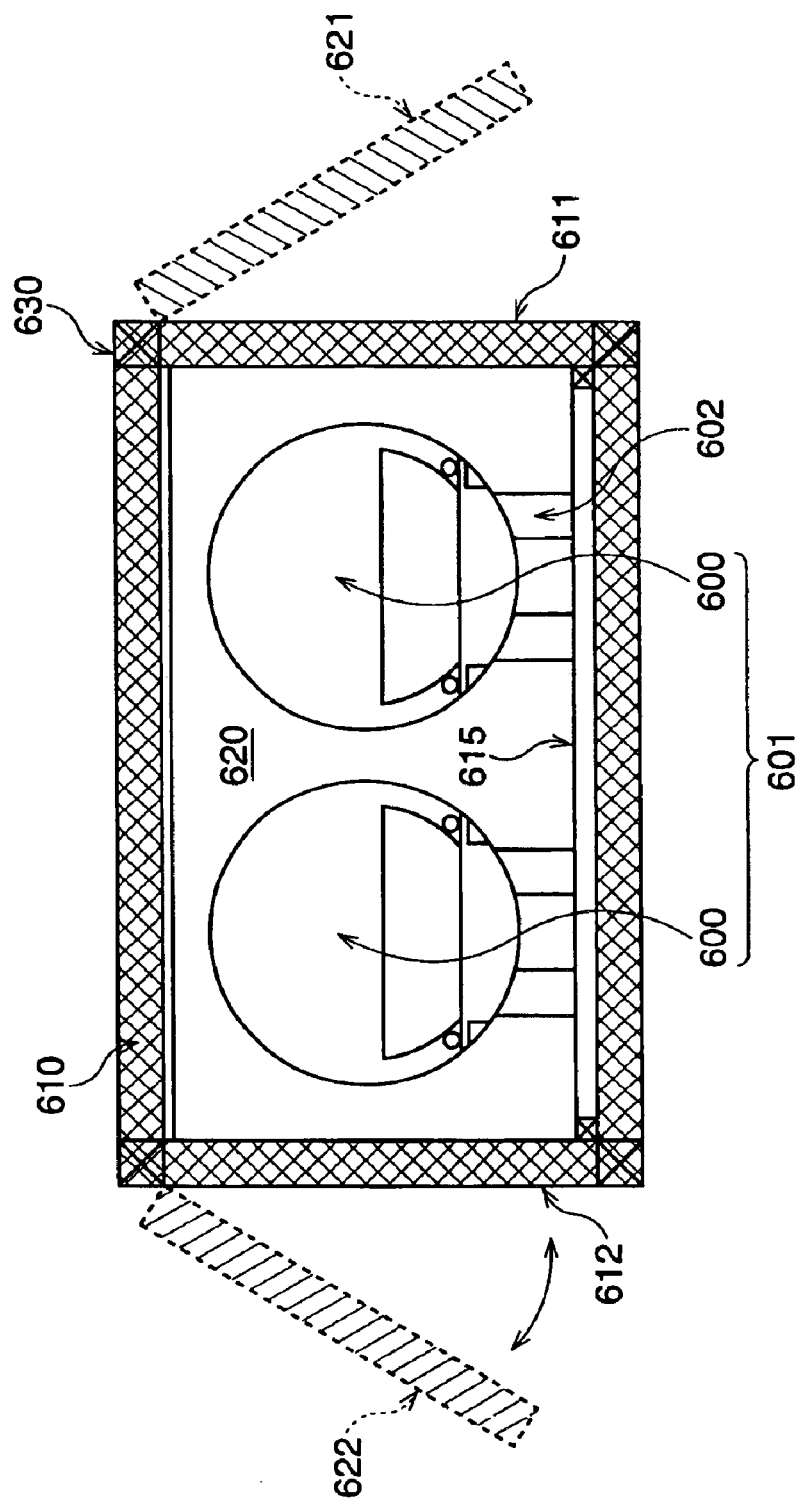
FIG. 23 is a cross-sectional view of the furnace in the forth embodiment according to the present invention.

FIGS. 22 and 23 show a furnace in the forth embodiment. In this embodiment, the furnace has the same structure as that of the first embodiment except that the outer chamber, the chamber holder, and the outer cover are formed in one body as an outer chamber 610. Therefore the outer chamber can not move. The differences from the first embodiment will be described next.

The furnace has a group of inner chambers 601 and an outer chamber 610. The group of inner chambers 601 is formed from two inner chambers 600 which extend substantially in a horizontal direction. The inner chambers are arranged in one line in the width direction of the inner chamber 600. The inner chambers 600 have legs 602. The inner chambers 600 are held by the bottom 615 of the outer chamber 610 through the legs 602. The inner chambers 600 have the same structure as that of the first embodiment.

The outer chamber 610 extends substantially in the horizontal direction in which the inner chambers 600 extend. The inner chambers 600 are entirely housed in the outer chamber 610. A combustion space 620 is formed between the inner surface of the outer chamber 610 and the outer surfaces of the inner chambers 600. One side 611 of the outer chamber 610 has two side outer lids 621. Another side 612 of the outer chamber 610 has two outer side lids 622.

One end 613 of the outer chamber 610 has an outer end lid 623, and another end 614 of the outer chamber 610 has an outer end lid 624. The outer end lid 623 is located over the inner lid 604 so as to input the material to the inner chambers 600.

The lids 621, 622, 623, and 624 are same structure as that of the inner lids in the first embodiment. Namely, the outer lids 621, 622, 623, and 624 are attached to the outer chamber with hinge joints. The outer lids 621, 622, 623, and 624 can be opened and closed.

The carbonizing process in this embodiment will be described below.

First, the outer end lid 623 and the inner lid 604 are opened. Next, the carbon carriers are moved out from the inner chamber through the inner lid 604 and the outer end lid 623. The material is loaded into the carbon carriers. And then, the carbon carriers, into which the material is loaded, are moves into the inner chambers 600 through the outer end lid 623 and the inner lid 604 so that the carbon carriers are housed in the inner chambers. Next, the outer end lid 623 and the inner lid 604 are closed.

Due to this, the combustion space is formed between the inner chambers 600 and the outer chamber 610. Next, the inner chambers 600 are heated by the gas burner etc., so that the material is carbonized at a predetermined temperature and for a predetermined time.

After finishing carbonizing, the outer lids 621, 622, 623, and 624 are opened to cool the inner chambers 600. When the temperatures in the inner chambers 600 drop below a predetermined temperature, the inner lids 604 are opened and then the carbon carriers, into which the carbonized material is loaded, are moved out from the furnace.

As described above, in this embodiment, the inner lids 604 and the outer end lids 623 are opened mainly to carry the material in and out. And the outer end lids 624 and the outer side lids 621 and 622 are opened mainly to cool the inner chambers 600. In this embodiment, the outer chamber does not move, therefore, the furnace can be established in a small space.

Further, in this embodiment, the outer lids 621, 622, 623, and 624 are attached to the outer chamber with hinge joints. However, hanging apparatuses may be provided above the outer lids 621, 622, 623, and 624. The hanging apparatuses may hang the lids 621, 622, 623, and 624, hence the hanging apparatuses can move the lids 621, 622, 623, and 624 up and down to open and close the lids.

Furthermore, the outer lids 621, 622, 623, and 624 may be separated from the outer chamber 610 in a similar to the inner chamber 80 of the other example in the first embodiment as shown in FIG. 13.

Figure 24:
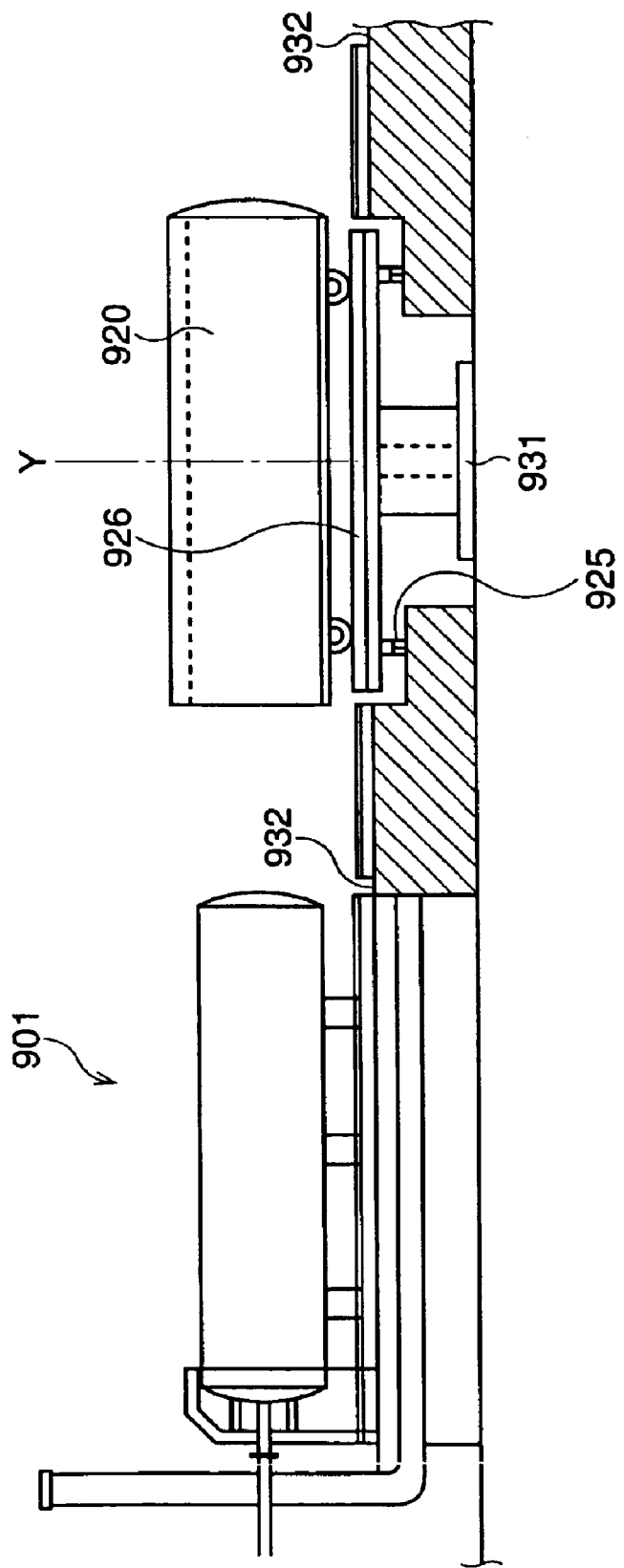
FIG. 24 is a side view of a furnace in the fifth embodiment according to the present invention.
Figure 25:
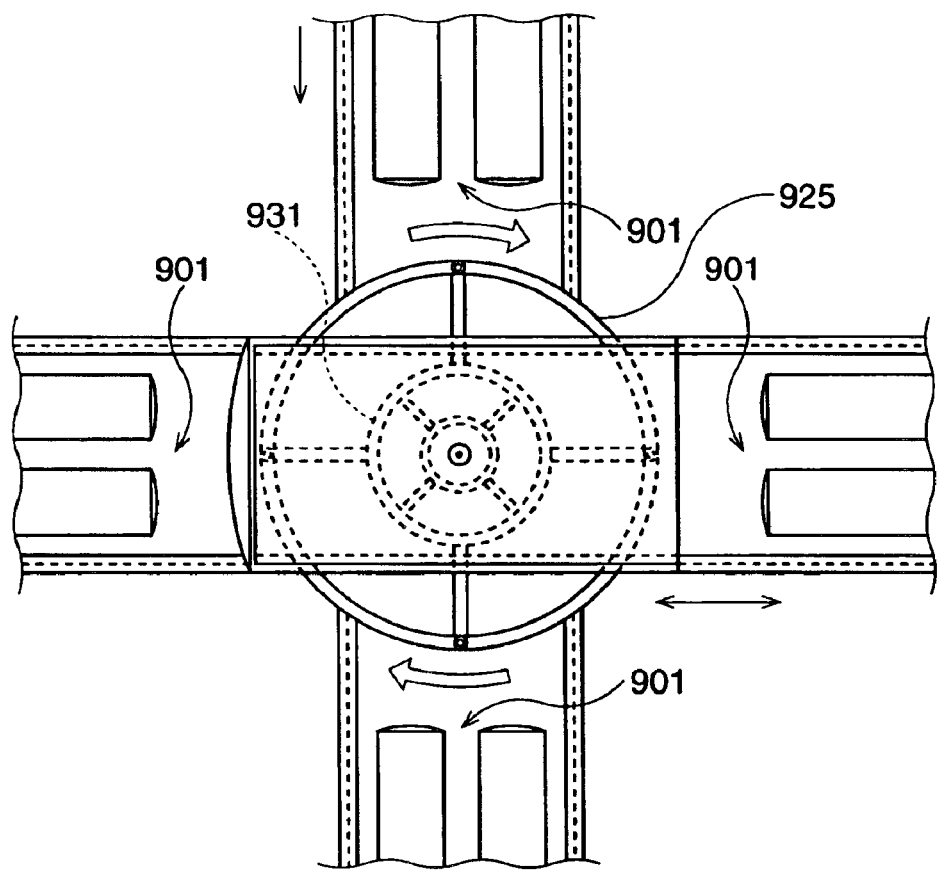
FIG. 25 is a plan view of the furnace in the fifth embodiment.
Figure 26:
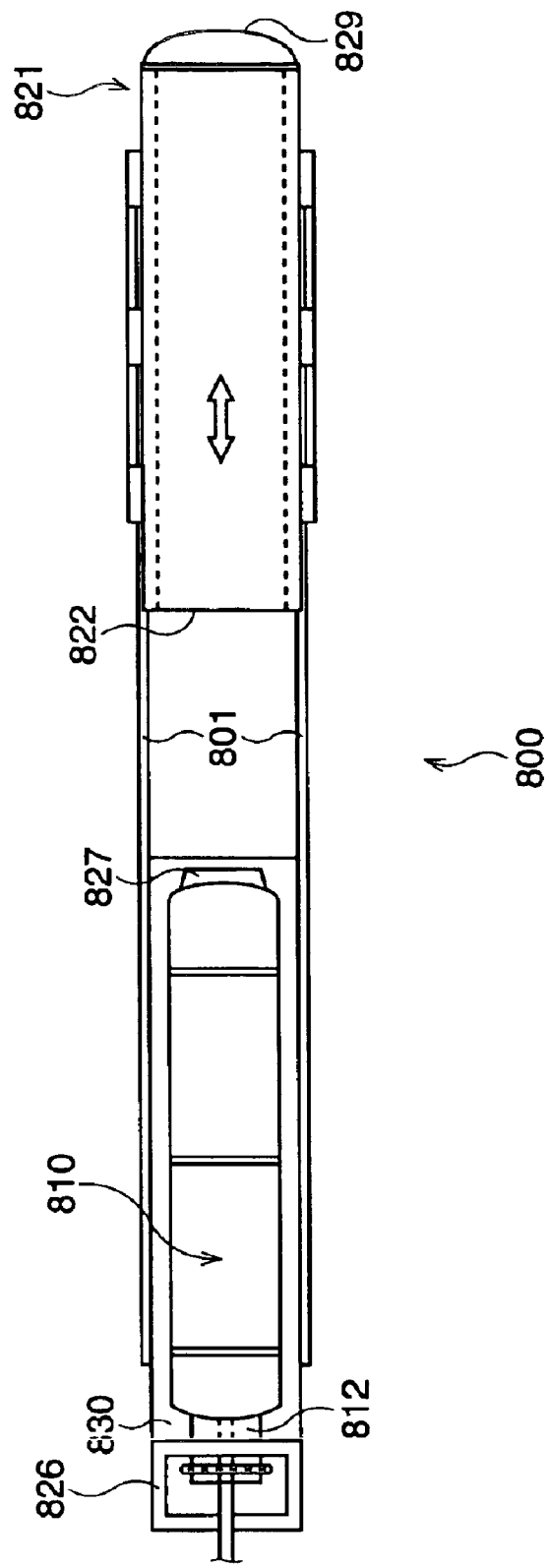
FIG. 26 is a plan view of a furnace in the sixth embodiment according to the present invention.

FIGS. 24 and 25 show a furnace in the fifth embodiment. The differences from the first embodiment will be described next.

In this embodiment, an outer chamber 920 is mounted on a moving apparatus 926. The moving apparatus 926 is further mounted on a rotating apparatus 931 and a third rail 925 which forms a ring if seen from above. The rotating apparatus 931 and the third rail 925 are provided under the ground 932. The moving apparatus 926 is rotated around an axis Y by the rotating apparatus 931 and is rotatively fixed to the third rail 925. Further, the axis Y extends in the vertical direction and is arranged in the center of the moving apparatus 926 and the rotating apparatus 931. Namely, in this embodiment, the outer chamber 920 rotates around the axis Y so as to move between four groups of inner chambers 901. Further, the furnace in this embodiment is provided with four groups of inner chambers 901 which are arranged on each line which radially extends from the rotating apparatus 931 as shown in FIG. 25.

FIGS. 26–33 show a furnace in the sixth embodiment. The differences from the previous embodiment will be described next. As show in FIG. 26, in this embodiment, the furnace 800 has an inner chamber 810 and an outer chamber 821. The inner chamber 810 is held by a chamber holder 830 which is provided on the ground 834 (referred in FIG. 27). An outer cover 826 is provided on the end of the chamber holder 830. One end of the outer chamber 821 is an opening end 822. Another end of the outer chamber 821 is a closing end 829.

The outer chamber 821 moves on a rail 801 so that the inner chamber 810 is housed in the outer chamber 821 through the opening end 822. In this case, the opening end 822 is entirely covered by the outer cover 826. Due to this, the combustion space 890 (referred in FIG. 27) is formed between an inner surface of the inner chamber 810 and the outer chamber 821.

The furnace in the sixth embodiment will be described in details next, referring to FIG. 27. The inner chamber 810 extends substantially in a horizontal direction. Namely, the length in the horizontal direction is longer than the diameter of the inner chamber 810. One end of the inner chamber has an inner lid 827 which can open and close. Namely, the inner lid 827 opens, and then one end of the inner chamber 810 becomes an opening. Another end of the inner chamber has a rotation portion 812 which is formed substantially in a column. The rotation portion 812 extends in the horizontal direction. A connection pipe 815 goes through the center of the rotation portion 812 in the horizontal direction. The gas discharged from the inner chamber 810 is sent to a separation apparatus 450 through the connection pipe 815 (referred in FIG. 32).

The rotation portion 812 is inserted through the outer cover 826. And the rotation portion 812 rotatively fixes to the outer cover 826. The end of the rotation portion 812 is located outside the outer chamber when the inner chamber 810 is housed in the outer chamber 821. This end of the rotation portion 812 is provided with a rotating apparatus 824. The rotating apparatus 824 is connected with a driving apparatus 825 which is provided on the ground 834. The rotating apparatus 824 is rotated by the driving apparatus 825 so that the rotation portion 812 rotates around an axis X. Namely, the inner chamber 810 rotates around the axis X. The axis X extends substantially in the horizontal direction at the center of the rotation portion 812 and the inner chamber 810. Namely, the inner chamber 810 rotates around the longitudinal axis of the inner chamber 810.

The chamber holder 830 has three pairs of hollows 872 are arranged in the direction of the axis X at even intervals. Two hollows 872 in each pair are arranged in the rotational direction of the inner chamber 810.

The outer surface of the inner chamber 810 is provided with guide portions 833 which extend around the inner chamber 810 in a rotational direction of the inner chamber 810. The guide portions 833 have a groove 832 which extend around the inner chamber 810 in the rotational direction. Each groove 832 corresponds to each pair of hollows 872.

Each of a plurality of balls 831 is rotatively fitted into each of the hollows 872. The hollows 872 are hemispheric, therefore, the half of ball is fitted into the hollow 872. Further, the ball 831 is rotatively fixed in the groove 832 which corresponds to the pair of the hollows 872.

Namely, the inner chamber 810 is rotatively held by the plurality of balls 831 in the chamber holder 830. Further, the inner chamber 810 is rotationally guided on the guide portions 833.

The driving apparatus 825 rotates the rotation portion 812 through gear wheels or chains using a driving motor. Further, the ball 831 is made of metal or ceramics.

Figure 28:
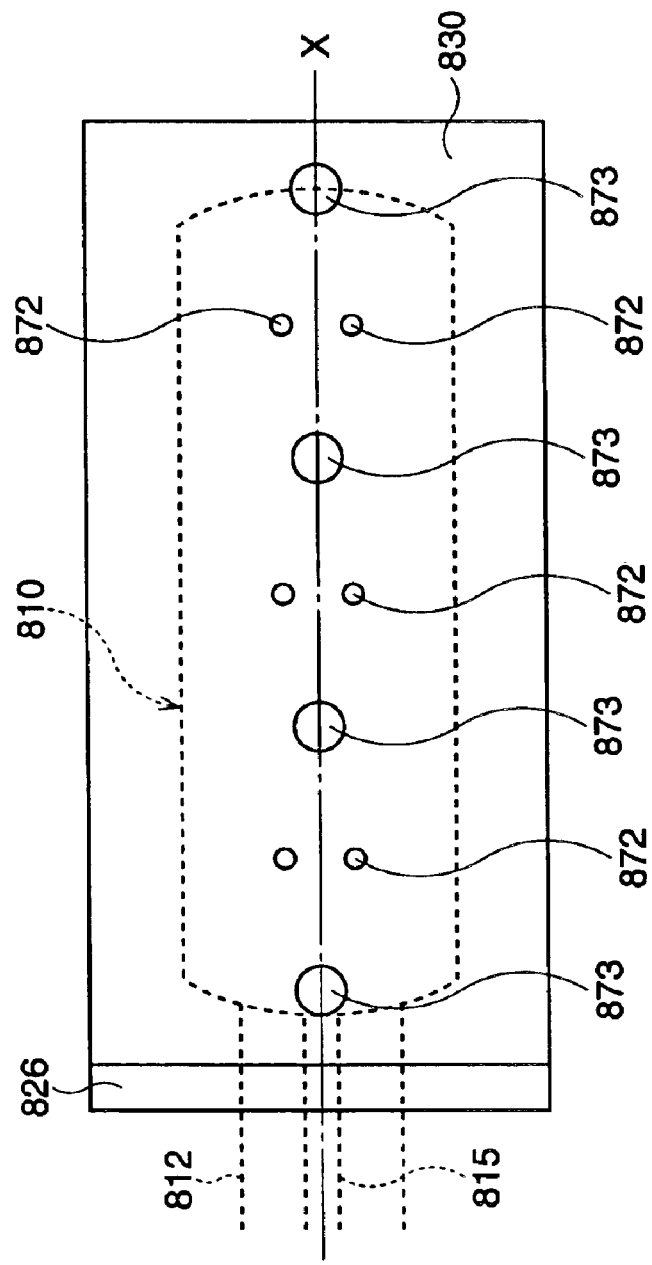
FIG. 28 is a plan view of a chamber holder which holds the inner chamber in the sixth embodiment.

FIG. 28 is a plan view of the chamber holder 830. If seen from above, the axis X overlaps a center line of the chamber holder 830. The chamber holder 830 is provided with heating mouths 873 spaced at even intervals from each other, similar to that in the previous embodiment. The heating mouths 873 are arranged along the center line. The pair of the hollows are disposed between the heating mouths 873. Two hollows 872 forming one pair are symmetrical with respect to the center line of the chamber holder 830.

Figure 27:
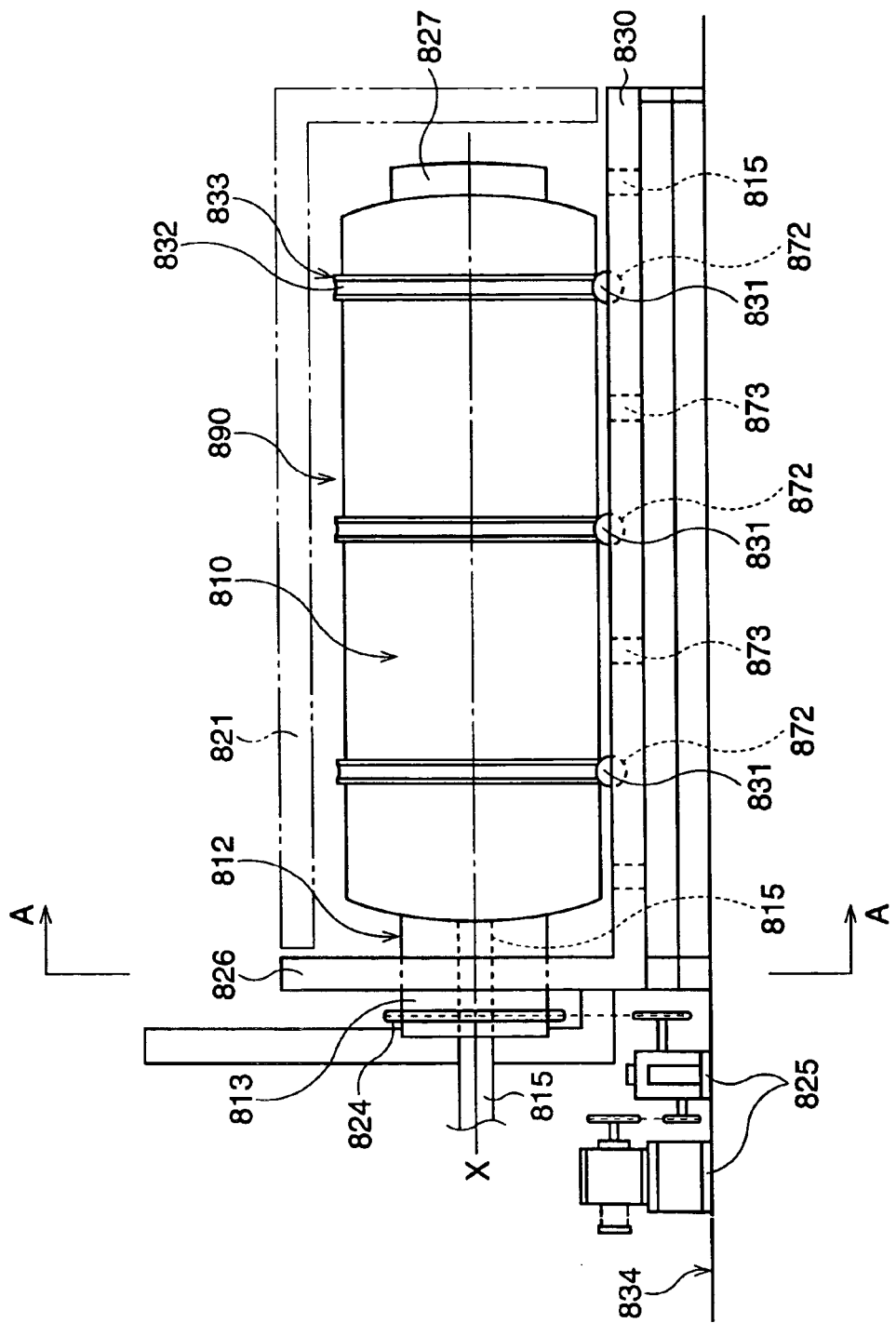
FIG. 27 is a side view of the furnace in the sixth embodiment when the inner chamber is housed in the outer chamber.
Figure 29:
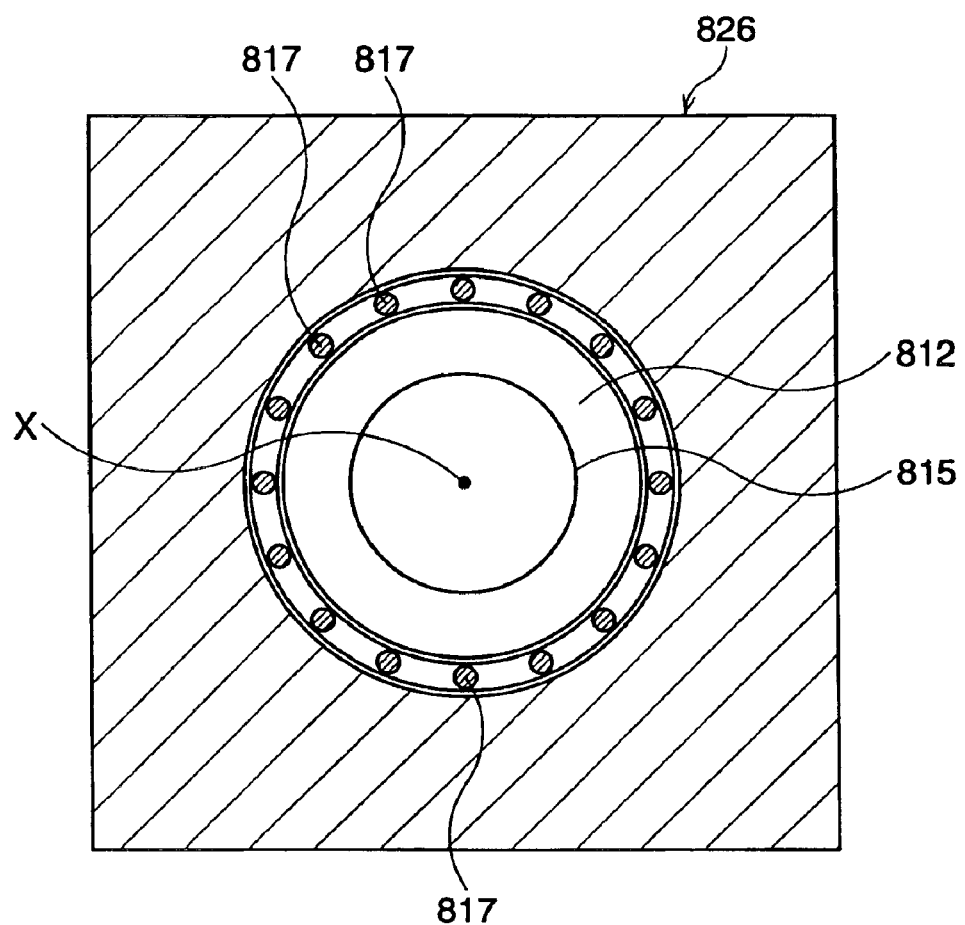
FIG. 29 is a sectional view along line A—A of FIG. 27.

FIG. 29 is a sectional view along line A—A of FIG. 27. The inner chamber 810 (namely the rotation portion 812) is inserted through the center of the outer cover 826 as described above. The rotation portion 812 is rotatively held by the outer cover 826 through a plurality of bearing portions 817 which are arranged between the outer cover 826 and the rotation portion 812. The bearing portions 817 are balls or rollers. The connection pipe 815 is inserted through the center of the rotation portion 812.

Figure 30:
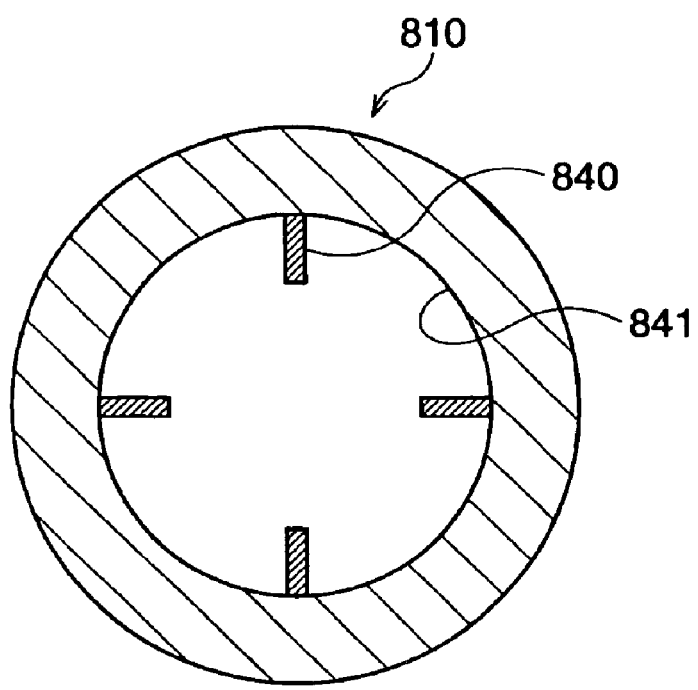
FIG. 30 is a cross-sectional view of the inner chamber in the sixth embodiment.

FIG. 30 is a cross-sectional view of the inner chamber 810. The inner chamber 810 is substantially cylindrical. The inner surface 841 of the inner chamber 810 is provided with four blades 840 which project in a vertical direction of the inner surface 841. The blades 840 mix the material in the inner chamber 810 when the inner chamber 810 rotates. The sections of the blades 840 are substantially rectangular. The blades extend from one end of the inner chamber to another end of the inner chamber 810 substantially in the horizontal direction. Namely, the blade 840 is formed in a rectangular bar.

Figure 31:
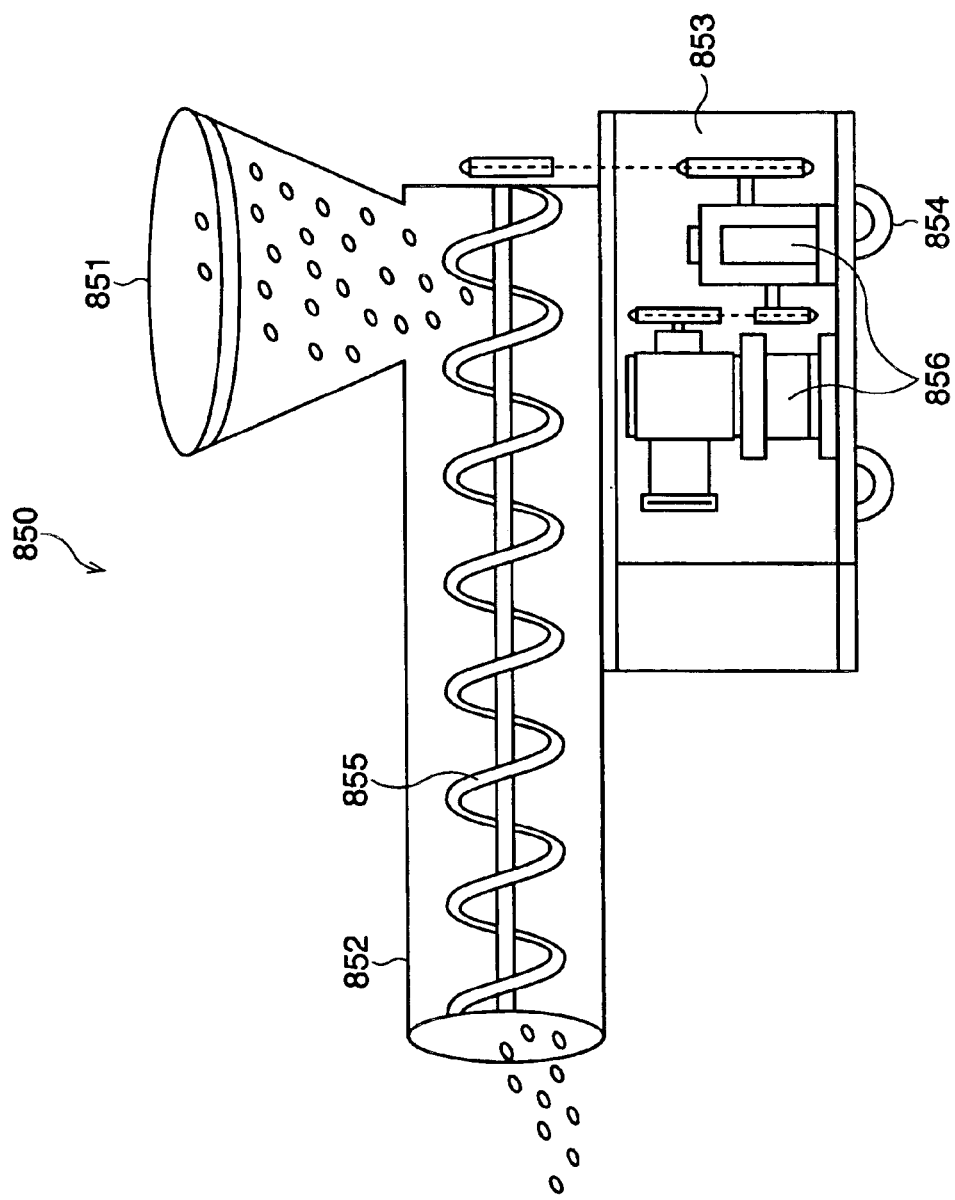
FIG. 31 is a side view of a conveyor apparatus which carries the material in the inner chamber in the sixth embodiment.

FIG. 31 shows a conveyor apparatus 850 which carries the material in the inner chamber 810. The conveyor apparatus 850 is provided with a hopper portion 851, a sending portion 852, and a driving portion 853. The sending portion 852 is cylindrical. The diameter of the sending portion 852 is smaller than diameter of the opening of the inner chamber 810 when the inner lid 827 opens. Therefore, the end of the sending portion 852 (namely the left end of the sending portion 852 in FIG. 31) can be inserted inside the inner chamber 810.

The inside of the sending portion 852 is provided with a spiral screw 855, which is rotated by a driving device 856 in the driving portion 853. The hopper portion 851 is connected with another end of the sending portion 852. The material is thrown in the hopper portion 851, and then the material is sent to the end of the sending portion 852 by the spiral screw 855 rotating so that the material is carried in the inner chamber 810. The conveyor apparatus 850 has wheels 854 in order to move.

Figure 32:
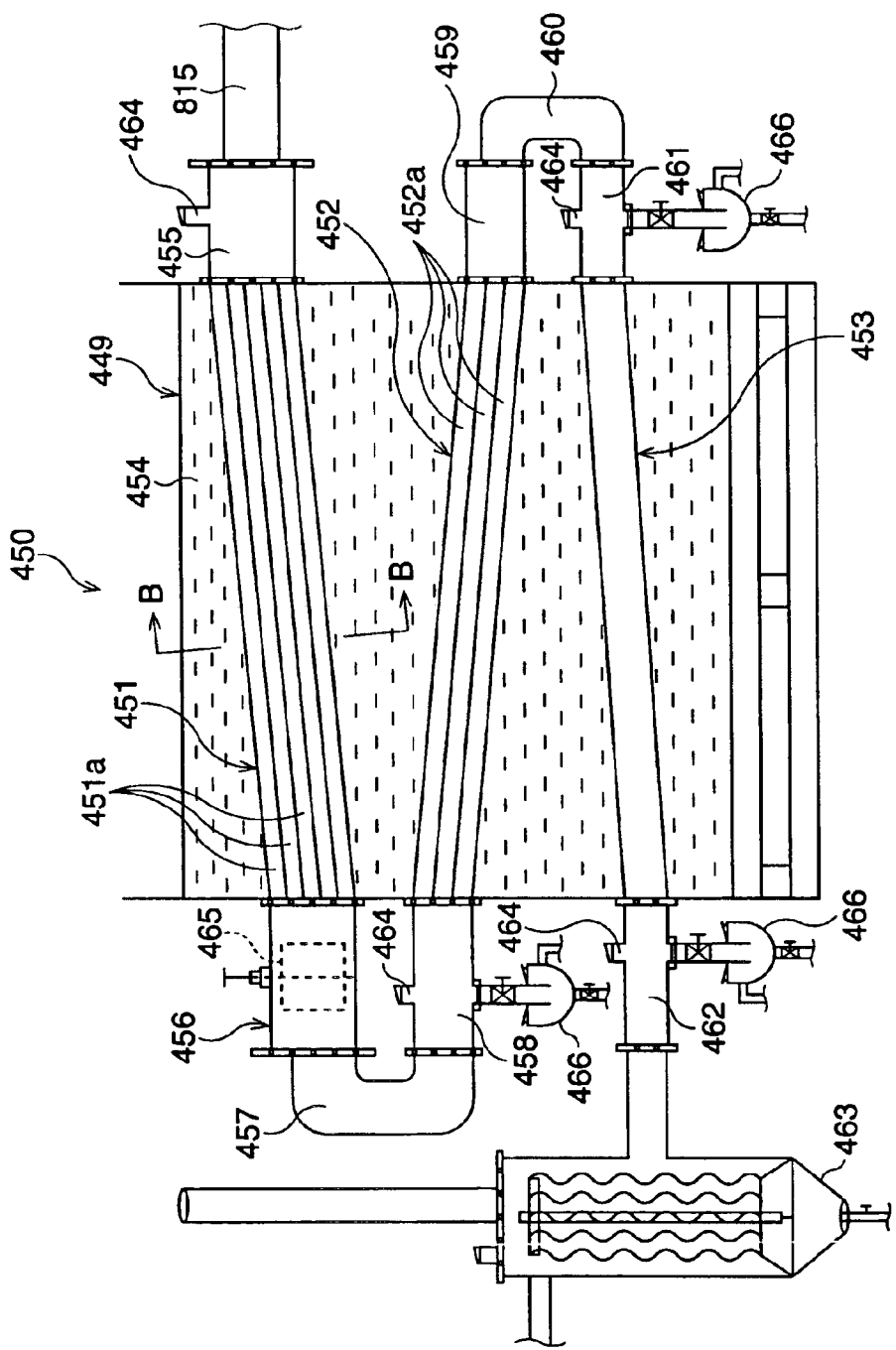
FIG. 32 is a side view of a separation apparatus in the sixth embodiment.

FIG. 32 shows a separation apparatus 450 in the sixth embodiment. The separation apparatus 450 has a cooling apparatus 449 which is filled with cooling liquid 454. The separation apparatuses 450 further has a first pipe group 451, a second pipe group 452, and a large diameter pipe 453 in the cooling apparatus 449. The first pipe group 451 is located above the second pipe group 452. The large diameter pipe 453 is located below the second pipe group 452.

The first pipe group 451 contains a plurality of first separation pipes 451a which have the same length, and which extend in a same direction. One end of each of the first separation pipes 451a is connected with the same first joint pipe 455. The first joint pipe 455 is connected with the connection pipe 815. Another end of each of the first separation pipes 451a is connected with the same second joint pipe 456. The first joint pipe 455 is located higher than the second joint pipe 456. Therefore the first separation pipes 451a are slanted at a predetermined angle.

The second joint pipe 456 is connected with a third joint pipe 458 through a linking pipe 457. The third joint pipe 458 is connected with one end of a second pipe group 452 which contains second separation pipes 452a in a similar way to the first pipe group 451. The number of first separation pipes 451a is higher than the number of second separation pipes 452a.

The second separation pipes 452a have the same length and extend in the same direction. The diameter of the second separation pipes 452a is larger than the diameter of the first separation pipes 451a. The second pipe group 452 is slanted in the opposite direction to the first pipe group but is at the same angle as the first pipe group 451. Another end of the second pipe group 452 is connected with a forth joint pipe 459.

The forth joint pipe 459 is connected with a fifth joint pipe 461 through a second linking pipe 460. The fifth joint pipe 461 is connected with one end of the large diameter pipe 453. The diameter of the large diameter pipe 453 is lager than the diameter of the second separation pipe 452a. The length of the large diameter pipe 453 is the same as the length of the second separation pipe 452a. The large diameter pipe 453 has the same slant as the first pipe group 451. Another end of the large diameter pipe 453 is connected with a sixth joint pipe 462. The sixth joint pipe 462 is connected with a gas separator 463. Extension pipes 464 project from the top of the first, third, fifth, and sixth joint pipes 455, 458, 461, and 462. The extension pipes 464 are used as a check valves or a safety valves. A flow control board 465 is provided inside the second joint pipe 456. The flow control board 465 can control the gas flow. Namely, the gas flow adjusting board 465 is fixed inside the second joint pipe 456 rotatively around an axis which extends through the diameter of the second joint pipe 456 in order to adjust the flow in the second joint pipe 456.

The discharged gas from the inner chamber 810 is cooled by the cooling liquid 454 in order to be liquefied while the discharged gas passes through the first separation pipes 451a. The discharged gas, which is not liquefied in the first separation pipes 451a, is cooled by the cooling liquid 454 in order to be liquefied while discharged gas passes through the second separation pipes 452a and the large diameter pipe 453. The discharged gas, which is not liquefied in the pipes 452a and 453, is sent to the gas separator 463.

The liquid, which is generated in the first separation pipes 451a, is sent to the third joint pipe 458 through the second joint pipe 456 and the linking pipe 457. And then, the liquid is drained into a drain tank apparatus 466 which is provided on the third joint pipe 458. The liquid, which is generated in the second separation pipes 452a and the large diameter pipe 453, is drained into the drain tank apparatuses 466 which are provided on the pipes 461 and 462. Further, the pipes 451a, 452a, and 453 are at a slant so that the liquid which is generated in the pipes can be efficiently sent to the drain tank apparatuses 466.

Figure 33:
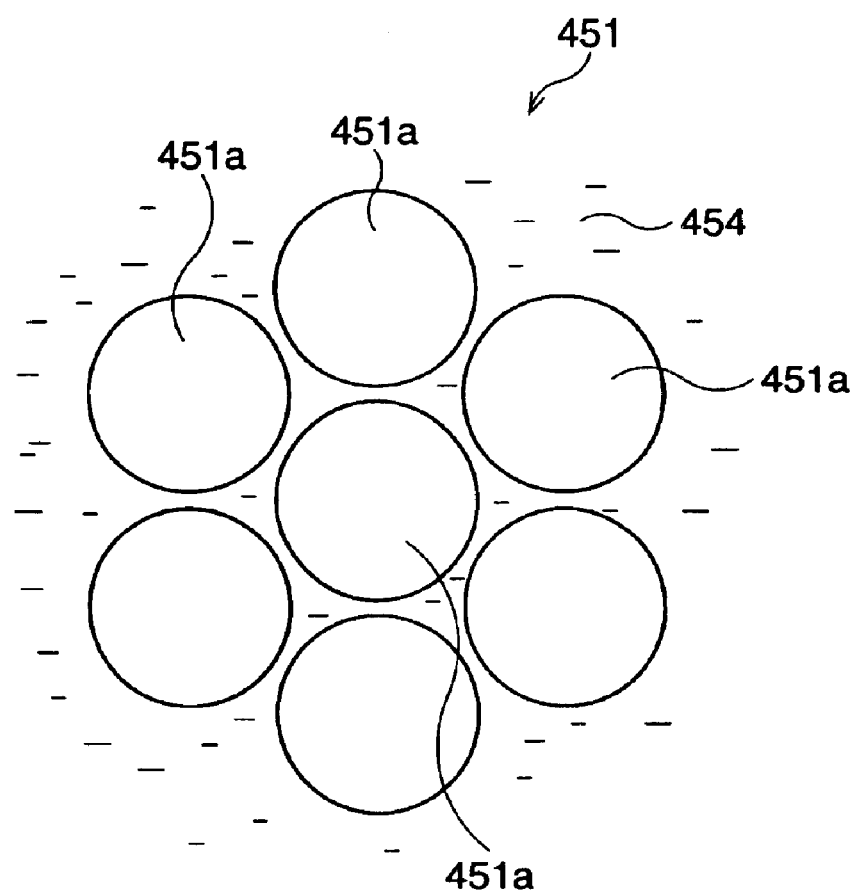
FIG. 33 is a sectional view along line B—B of FIG. 32.

FIG. 33 is a sectional view along line B—B of FIG. 32. As shown in FIG. 33, the first pipe group 451 is formed from seven first separation pipes 451a. One of the first separation pipes 451 is arranged in the center of the group 451, the six other first separation pipes 451a are arranged around the center pipe. The adjoining first separation pipes 451a in the group 451 are separated from one another substantially at even intervals. Due to this, the outer surface of each of the first separation pipes 451a contact the cooling liquid 454. Therefore, each of the first separation pipes 451a is efficiently cooled by the cooling liquid 454.

Further, the adjoining second separation pipes 452a in the second pipe group 452 are separated from one another substantially at even intervals in a similar way to the first pipe group 451.

Further, in this embodiment, the further through the process, the less the amount of gas, because of condensation. Therefore, the number of pipes in the first pipe group 451 is higher than that in the second pipe group 452, and there is only one large diameter pipe 453 at last end.

Furthermore, in this embodiment, the first and second pipe groups are provided in the separation apparatuses 450. However, the number of the pipe groups is not limited to two, namely, the number of the pipe groups can be changed depending on the purpose. But further through the process, the fewer the number of pipes.

Further, in this embodiment, the separation apparatuses 30 in the previous embodiment may be used instead of the separation apparatuses 450. Furthermore, from the first to the fifth embodiments, the separation apparatuses 450 in the sixth embodiments may be used instead of the separation apparatuses 30 in the previous embodiment.

As described above, the inner chamber 810 is rotated around the axis X so as to mix the material in the inner chamber 810. Due to this, the material is heated effectively and the inner chamber is ventilated. Therefore, the material is carbonized effectively.

Further, in this embodiment, the outer chamber 821 is movable. However, the outer chamber 821 may be fixed. Namely, the outer chamber 821, the outer cover 826, and the chamber holder 830 may be formed in one body as an outer chamber which can not be moved. In this case, the inner chamber is always housed in the outer chamber so that a combustion space is formed between the inner chambers and the outer chamber.

Further, in this embodiment, the outer surface of the inner chamber 810 is provided with the grooves 822, and the balls 831, which are provided on the chamber holder 830 are fitted into the groves 822. However, rollers may be provided on the chamber holder 830, and fitted into the groves 822 instead of the balls 831.

Further, the outer surface of the inner chamber 810 may be provided with projections which extend around the inner chamber 810 in the rotational direction, and the upper surface of the chamber holder 830 may be provided with grooves which extend in the rotational direction. And then the projections may be rotatively fixed into the grooves so as to rotate the inner chamber 810.

Figure 34:
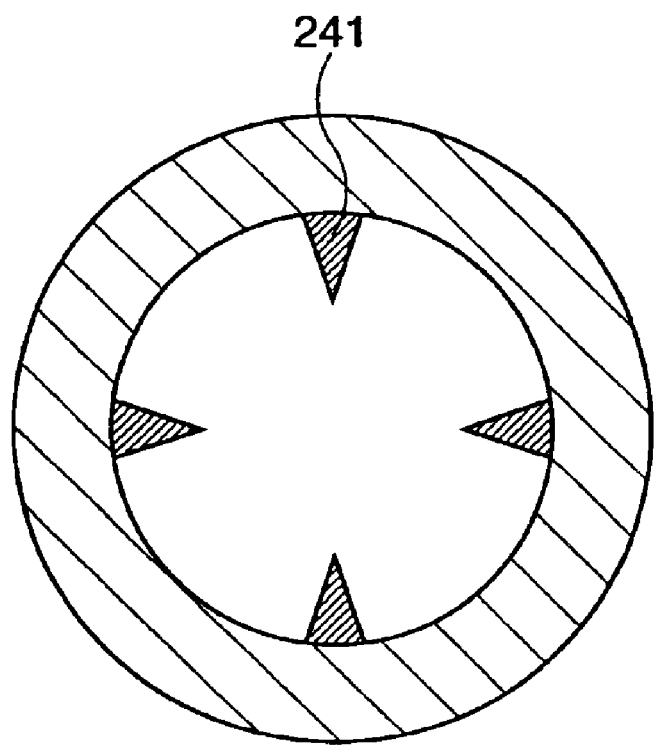
FIG. 34 is a cross-sectional view of the inner chamber of the other example in the sixth embodiment.

FIG. 34 shows the inner chamber of an other example in the sixth embodiment. The inner chamber of this example has the same structure as that of the sixth embodiment except that the sections of the blades 840 are formed in an isosceles triangle instead of a rectangle.

Figure 35:
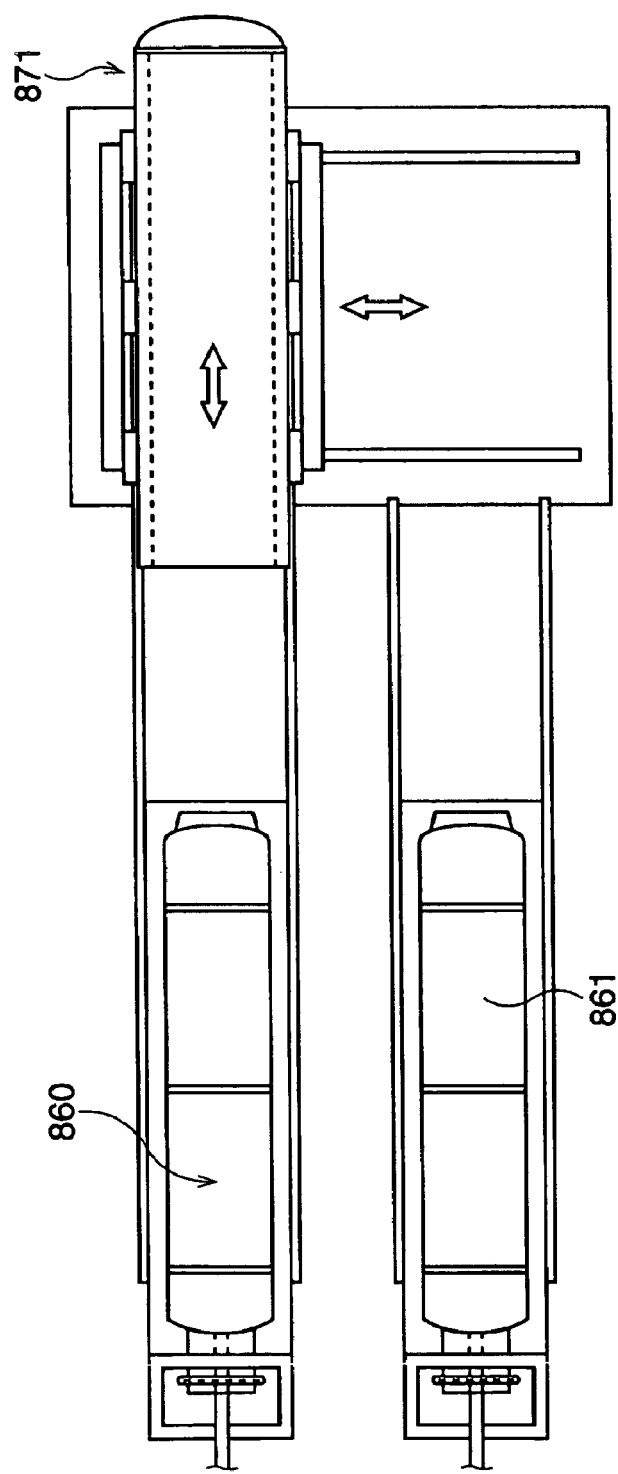
FIG. 35 is a plan view of a furnace in the seventh embodiment.

FIG. 35 shows the furnace in a seventh embodiment. The furnace of the seventh embodiment has the same structure as that of the sixth embodiment except that first and second inner chambers 860 and 861 are arranged in one line, in the width direction of the inner chambers 860, and that an outer chamber 871 can move from the first inner chamber 860 to the second inner chamber 861.

Further, the inner chambers may form a group of inner chambers and then the group of inner chambers may be housed in the outer chamber. Furthermore, the first and second groups may be formed, and then the outer chamber may move from the first group to the second group.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2002-289107 (filed on Oct. 1, 2002) and No. 2003-104450 (filed on Apr. 8, 2003) which are expressly incorporated herein, by reference, in their entirety.

What is claimed is:

1. A furnace for carbonizing material, said furnace comprising:
    a group of inner chambers, each inner chamber in said group of inner chambers having a lid which can be opened and closed to input material;
    a holder which holds said group of inner chambers, said holder moving in one of a horizontal direction and a vertical direction; and
    an outer chamber having an opening;
    said outer chamber and said group of inner chambers moving relative to each other so that said group of inner chambers is housed in said outer chamber through said opening, whereby a combustion space is formed between said group of inner chambers and said outer chamber so as to heat each said inner chamber to dry the input material by distillation.

2. A furnace according to claim 1, wherein said outer chamber moves so that said group of inner chambers is housed in said outer chamber.

3. A furnace according to claim 1, wherein each said inner chamber extends substantially in a horizontal direction, one end of each said inner chamber being closed, another end of each said inner chamber having said lid.

4. A furnace according to claim 1, wherein one end of said outer chamber is closed and another end of said outer chamber has said opening.

5. A furnace according to claim 1, comprising a plurality of said groups of inner chambers, said outer chamber being movable from one of said plurality of groups of inner chambers to another of said plurality of groups of inner chambers.

6. A furnace according to claim 1, wherein each said lid can separate from each said inner chamber.

7. A furnace according to claim 1, said holder holding an outer cover and said group of inner chambers, said outer cover covering said opening when said group of inner chambers is housed in said outer chamber.

8. A furnace according to claim 1, further comprising a carrier which moves in said inner chamber, said material being loaded into said carrier.

9. A furnace according to claim 8, wherein a plurality of said carriers are housed in each said inner chamber, one of said plurality of carriers being disposed above another of said plurality of carriers.

10. A furnace according to claim 1, wherein said outer chamber moves in one of a horizontal direction and a vertical direction.

11. A furnace according to claim 1, wherein an outer surface of said inner chamber is provided with a heat receiving portion which projects outward.

12. A furnace according to claim 1, wherein said material is carbonized whereby gas is generated from said material, said gas being discharged from said inner chamber.

13. A furnace according to claim 1, further comprising a separation apparatus that cools gas discharged from said inner chamber so as to liquefy said discharged gas,
    said separation apparatus comprising:
        a first separation pipe that connects with said inner chamber;
        a second separation pipe that connects with said first separation pipe through a joint pipe, the discharged gas passing through said second separation pipe after passing through said first separation pipe; and
        a cooling apparatus that cools the discharged gas in said first and second separation pipes,
        a diameter of said first separation pipe being larger than a diameter of said second separation pipe.

14. A furnace according to claim 1, further comprising a separation apparatus that cools gas discharged from said inner chamber so as to liquefy said discharged gas,
    said separation apparatus comprising:
        a first pipe group containing a plurality of first separation pipes, each of said first separation pipes connecting with said inner chamber, said discharged gas passing through said first separation pipes; and
        a cooling apparatus which cools said discharged gas in said first separation pipes.

15. A furnace according to claim 14, wherein said separation apparatus further has one connection pipe which connects with said inner chamber, said plurality of first separation pipes connecting with said inner chamber through said one connection pipe.

16. A furnace according to claim 15, wherein said plurality of said first separation pipes have the same length, and extend in the same direction, one end of said first separation pipes connecting with said one connection pipe, another end of said first separation pipes connecting with one joint pipe.

17. A furnace according to claim 14, wherein adjoining first separation pipes in said first pipe group are separated from one another.

18. A furnace according to claim 14, wherein said separation apparatus further comprising;
one joint pipe to which said plurality of first separation pipes connect; and
a second pipe group of a plurality of second separation pipes, said plurality of second separation pipes connecting with said one joint pipe, said discharged gas passing through said second separation pipes after passing through said first separation pipes, said cooling apparatus further cooling said discharged gas in said second separation pipes.

19. A furnace for carbonizing material, comprising:
an outer chamber; and
an inner chamber that is provided in said outer chamber so that a combustion space is formed between said inner chamber and said outer chamber so as to heat said inner chamber to dry a material by distillation, said inner chamber having a lid which can be opened and closed to input the material, said inner chamber rotating around a longitudinal axis of said inner chamber, said longitudinal axis extending substantially in a horizontal direction.

20. A furnace according to claim 19, comprising a rotating element for rotating said inner chamber, said rotating element being disposed on an end of said inner chamber, said end being located outside said outer chamber.

21. A furnace according to claim 20, wherein said inner chamber is inserted into said outer chamber whereby said inner chamber rotatively fixes to said outer chamber.

22. A furnace according to claim 19, wherein an inner surface of said inner chamber is provided with a blade which extends substantially in a horizontal direction so as to mix said material when said inner chamber rotates.

23. A furnace according to claim 19, comprising: a holder having a plurality of hollows; and
a plurality of balls being rotatively fitted into said plurality of hollows, said inner chamber being rotatively held by said plurality of balls in said holder.

24. A furnace according to claim 23, wherein an outer surface of said inner chamber is provided with a plurality of groove elements which extend around said inner chamber in a rotational direction of said inner chamber, said inner chamber rotating on said plurality of balls, said plurality of balls fitting in said plurality of grooves.

25. A furnace according to claim 24, wherein said groove elements form guide portions which extend around said inner chamber in a rotational direction of said inner chamber, said inner chamber being rotationally guided on said guide portions.

26. A furnace according to claim 19, wherein said inner chamber extends substantially in said horizontal direction.

27. A furnace according to claim 19, wherein said outer chamber and said inner chamber move relative to each other so that said inner chamber can be housed in said outer chamber and can be apart from said outer chamber.

28. A furnace according to claim 27, comprising a plurality of said inner chambers, said outer chamber being movable from one of said plurality of inner chambers to another of said plurality of inner chambers.

29. A furnace according to claim 27, further comprising: a holder that holds said inner chamber and an outer cover, said outer chamber having an opening,
wherein said outer cover covers said opening when said inner chamber is housed in said outer chamber, whereby said combustion space is formed between said inner chamber and said outer chamber.

30. A furnace according to claim 29, wherein said inner chamber is arranged through said outer cover whereby said inner chamber is rotatively fixed to said outer cover.

31. A furnace according to claim 19, wherein said inner chambers form a group of inner chambers, said group of inner chambers being provided in said outer chamber.

32. A furnace according to claim 31, wherein said outer chamber and said group of inner chambers move relative to each other so that said group of inner chambers is housed in said outer chamber.

33. A furnace according to claim 32, further comprising a plurality of said groups of inner chambers, said outer chamber being movable from one of said plurality of groups of inner chambers to another of said plurality of groups of inner chambers.

34. A furnace for carbonizing material, said furnace comprising:
a group of inner chambers, each inner chamber in said group of inner chambers having a lid which can be opened and closed to input material;
an outer chamber having an opening;
said outer chamber and said group of inner chambers moving relative to each other so that said group of inner chambers is housed in said outer chamber through said opening, whereby a combustion space is formed between said group of inner chambers and said outer chamber so as to heat each said inner chamber to dry the input material by distillation,
wherein the input material is carbonized whereby gas is generated from the input material, the gas being discharged from said inner chamber, and a part of the discharged gas is sent back to each said inner chamber.

35. A furnace for carbonizing material, said furnace comprising:
a group of inner chambers, each inner chamber in said group of inner chambers having a lid which can be opened and closed to input material;
an outer chamber having an opening;
said outer chamber and said group of inner chambers moving relative to each other so that said group of inner chambers is housed in said outer chamber through said opening, whereby a combustion space is formed between said group of inner chambers and said outer chamber so as to heat each said inner chamber to dry the input material by distillation,
wherein the input material is carbonized whereby gas is generated from the input material, the gas being discharged from said inner chamber,
the furnace further comprising a combustion apparatus, which burns the discharged gas, said combustion apparatus comprising:
a first combustion chamber to which the discharged gas is sent, the discharged gas being burnt in said first combustion chamber;
a second combustion chamber, to which the discharged gas which has passed through said first combustion chamber is sent, the discharged gas being burnt again using charcoal in said second combustion chamber; and a brick layer that is heated by said charcoal, the discharged gas which has passed through said first combustion room or said second combustion room, being burnt again by said brick layer.

* * * * *

UNITED STATES PATENT AND TRADEMARK OFFICE
CERTIFICATE OF CORRECTION

PATENT NO. : 6,874,435 B2
DATED : April 5, 2005
INVENTOR(S) : T. Maesato

It is certified that error appears in the above-identified patent and that said Letters Patent is hereby corrected as shown below:

Column 21,
Line 44, before "comprising" insert -- further --.

Signed and Sealed this

Thirty-first Day of January, 2006

JON W. DUDAS
*Director of the United States Patent and Trademark Office*